US011553246B1

(12) United States Patent
Braun et al.

(10) Patent No.: US 11,553,246 B1
(45) Date of Patent: Jan. 10, 2023

(54) COMPUTER SYSTEM AND METHOD FOR RECORDING, MANAGING, AND WATCHING VIDEOS

(71) Applicant: Screencastify, LLC, Chicago, IL (US)

(72) Inventors: Manuel Braun, Cologne (DE); Henry Mann, Chicago, IL (US)

(73) Assignee: Screencastify, LLC, Chicago, IL (US)

( * ) Notice: Subject to any disclaimer, the term of this patent is extended or adjusted under 35 U.S.C. 154(b) by 0 days.

(21) Appl. No.: 17/470,706

(22) Filed: Sep. 9, 2021

(51) Int. Cl.
*H04N 5/76* (2006.01)
*H04N 21/472* (2011.01)
*H04N 21/4402* (2011.01)
*G06F 3/0482* (2013.01)
*H04L 67/1097* (2022.01)
*H04N 21/442* (2011.01)
*H04L 67/53* (2022.01)

(52) U.S. Cl.
CPC ....... *H04N 21/4402* (2013.01); *G06F 3/0482* (2013.01); *H04L 67/1097* (2013.01); *H04L 67/53* (2022.05); *H04N 5/76* (2013.01); *H04N 21/44222* (2013.01); *H04N 21/47217* (2013.01)

(58) Field of Classification Search
CPC ................. H04N 21/4402; H04N 5/76; H04N 21/44222; H04N 21/47217; G06F 3/0482; H04L 67/1097; H04L 67/53
See application file for complete search history.

(56) References Cited

U.S. PATENT DOCUMENTS

| 11,134,316 | B1* | 9/2021 | Pavlosky | H04N 21/47815 |
| 2009/0106200 | A1* | 4/2009 | Salinas | G06F 16/70 |
| 2019/0286854 | A1* | 9/2019 | Patel | G06F 21/6218 |
| 2022/0012073 | A1* | 1/2022 | Granot | H04L 67/10 |

\* cited by examiner

*Primary Examiner* — Alazar Tilahun
(74) *Attorney, Agent, or Firm* — Lee Sullivan Shea & Smith LLP

(57) ABSTRACT

A computing platform may be configured to (i) cause a first client station to present a first interface of a SaaS application, (ii) receive, from the first client station, a given video that was recorded at the first client station utilizing the first interface, (iii) transmit a request for the given video to be stored at a third-party cloud storage platform, (iv) receive from a second client station, a communication indicating a request to watch the given video, and (v) after receiving the communication: (a) cause the second client station to present a second interface of the SaaS application, (b) transmit a request to obtain the given video from the third-party cloud storage platform, (c) receive the given video from the third-party cloud storage platform, (d) divide the given video into a sequence of video segments, and (e) stream the sequence of video segments to the second client station.

20 Claims, 13 Drawing Sheets

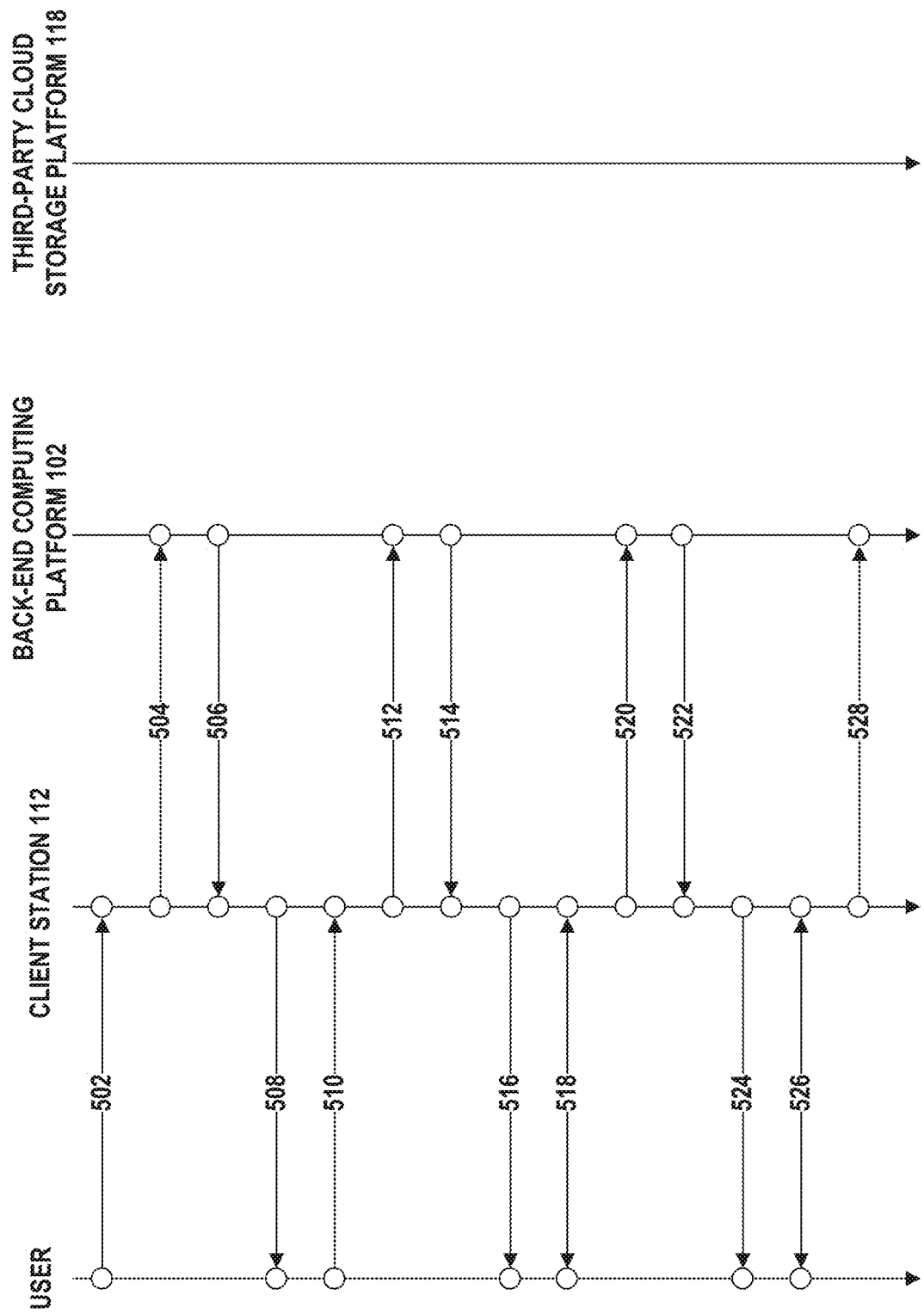

COMPUTER SYSTEM AND METHOD FOR RECORDING, MANAGING, AND WATCHING VIDEOS

BACKGROUND

One category of software applications that exists today are software applications that allow a user to record and manage videos on the user's client station. Typically, a software application for recording and managing videos may take the form of a software as a service (SaaS) application that is hosted by a back-end platform operated by the provider of the SaaS application and delivered to users over a data network such as the Internet. In such a SaaS application, a user may be able to access an interface for recording a video and subsequently record a video. When the video recording is completed, the video may then be stored on the back-end platform for future access by the user. Additionally, in some SaaS applications, the user can also choose the allow other users of the SaaS application to access the video.

OVERVIEW

While software as a service (SaaS) applications that allow a user to record videos on the user's client station exist, these existing SaaS applications have many limitations and drawbacks. For instance, in most existing SaaS applications, recorded videos are stored on the back-end computing platform operated by the SaaS provider, which presents drawbacks for the SaaS provider because the SaaS provider is tasked with maintaining the videos on the users' behalf. In turn, this may increase the burden on the SaaS provider insofar that it may introduce security risks and increase overall cost. Further, while most existing SaaS applications may allow a given user to share a recorded video with other users, the sharing functionality is typically limited and does not provide the given user with any information as to which other users accessed the video or the extent to which the other users accessed the video. Further yet, in most existing SaaS applications, it is typically difficult or impossible for a given user to add items like quiz questions, poll questions, or the like to videos that have been recorded on the user's client station, let alone collect information related to other users' interaction with those items. Even further, when a given user desires to view a recorded video, most existing SaaS platforms send the entire recorded video to the given user's client station, which may cause the given user to wait until the given user's client station has received the entire recorded video before the given user can view the recorded video. Existing SaaS applications for recording videos may have various other limitations and drawbacks as well.

In order to overcome the limitations and drawbacks of existing SaaS applications for recording videos, disclosed herein is new software technology for recording, storing, sharing, managing, viewing, and/or interacting with videos. In practice, the disclosed software technology may be incorporated into a SaaS application that is offered by a SaaS provider such as an independent software vendor (ISV), which may operate a back-end computing platform that hosts the SaaS application and delivers it to users over a data network such as the Internet.

At a high level, the disclosed software technology may provide a user interested in creating videos (referred to herein as a "creating user" or "creator") with the ability to (i) record a video on the user's client station, (ii) have the recorded video stored at a third-party cloud storage platform, (iii) make the recorded video available for access by other users, and/or (iv) perform various management functions for the recorded video, and correspondingly, the disclosed software technology may then provide a user interested in watching videos (referred to herein as a "watching user" or a "viewer") with the ability to access, watch, and perhaps also interact with the recorded video. The disclosed software technology may comprise various software tools that facilitate the above functionality, each of which may take various forms.

As one possibility, the disclosed software technology may comprise a first software tool that enables a creating user to record a video on the user's client station and then have the video stored at a third-party cloud storage platform (e.g., a cloud storage platform such Google Drive, Microsoft OneDrive, Dropbox, Box, etc. with which the creating user has a user account) as opposed to the back-end computing platform for the SaaS application that incorporates the first software tool, which may avoid the drawbacks associated with storing user-recorded videos on such a back-end computing platform. This first software tool may be referred to herein as the "record tool." To illustrate with an example, the disclosed record tool could be utilized by a teacher that desires to record a lesson for her students. In such an example, the teacher may access the record tool (which as noted above may be hosted by the back-end computing platform operated by the SaaS provider) via a client station and then interact with the front-end interface of the record tool to record a video on the client station (e.g., via a camera, a microphone, and/or screen capture technology), and after the recording is complete, the record tool may then cause the recorded video to be uploaded to a third-party cloud storage platform for storage and future access by the teacher and/or the teacher's students.

As another possibility, the disclosed software technology may comprise a second software tool that enables a creating user to perform various management functions for videos that have been recorded via the record tool and stored at a third-party cloud storage platform, examples of which may include defining sharing settings for a recorded video, adding viewer feedback elements (e.g., quiz questions, polls, or the like) to a recorded video, and/or accessing viewer metrics for a recorded video (e.g., number of views, identification of viewers, most recent views, percentage of the video watched on a user-by-user basis, viewer responses to quiz questions, polls, or the like, etc.), among other possibilities. This second software tool may be referred to herein as the "management tool." To illustrate with an example, the disclosed management tool could be utilized by a teacher that has recorded a lesson for the teacher's students. In such an example, the teacher may first utilize the management tool to define which students have access to the recorded lesson video, and then after the lesson has been shared with the students, the teacher may later utilize the management tool to review viewer metrics related to the recorded lesson video, such as which students have watched at least a portion of the recorded lesson video, the viewing progress of each student that has watched at least a portion of the recorded lesson video (e.g., an indication of the amount of the video that has been watched by the student and/or an indication of whether or not the student has completed watching the video, etc.), and/or responses to quiz questions or the like that have been inserted into the recorded lesson video, among other possible viewer metrics. After the teacher views all of this information, the teacher may utilize the record tool to provide feedback to each of the students through the form of a video response explaining the highlights (or lowlights) of the student's performance vis-à-vis the recorded lesson video. The recorded feedback video may be shown within the management tool in a similar way as the recorded lesson video.

As yet another possibility, the disclosed software technology may comprise a third software tool that enables a watching user to access and watch videos that have been recorded via the record tool and stored at a third-party cloud storage platform, and may also enable the watching user to interact with viewer feedback elements that are presented to the watching user while watching such videos (e.g., by inputting responses to quiz questions, polls, or the like). This third software tool may be referred to herein as the "watch tool." To illustrate with an example, the disclosed watch tool could be utilized by a student that needs to view a lesson video that was previously recorded by a teacher using the record tool. In such an example, the student may utilize the watch tool to access and view the recorded lesson video, and if the recorded lesson video viewer feedback elements such as quiz questions, polls, or the like, the student may also utilize the watch tool to interact with those viewer feedback elements while watching the recorded lesson video (e.g., by inputting responses to quiz question that are presented to the student at predefined times during the recorded lesson video).

In order to provide this ability for a watching user with to watch a video that has been recorded via the record tool and stored at a third-party cloud storage platform, the back-end computing platform hosting a SaaS application that incorporates the watch tool may function to access the video recorded video from the third-party cloud storage platform and present it to the user in a seamless way that does not suffer from noticeable delays, stutters, or the like. However, presenting the recorded video in this way may present technological challenges because it requires the back-end computing platform to access and receive the recorded video from the third-party cloud storage platform and immediately provide it to the user's client station over a data network such as the Internet. The functions of receiving and sending the recorded video for presentation may cause delays since the back-end computing platform typically has to finish receiving the recorded video before it can send the recorded video to the user's client station.

To overcome these technical challenges, the back-end computing platform hosting the watch tool may include technology for accessing a recorded video stored at a third-party cloud storage platform and presenting it to the user in a seamless way that does not suffer from noticeable delays, stutters, or the like. To accomplish this, at a high level, the back-end computing platform may (i) receive the video from the third-party cloud storage platform, (ii) take any necessary actions to prepare the video for viewing, and (iii) stream the prepared video to the user's client station. Further, at a high level, preparing the video for viewing may include (i) accessing video metadata related to the recorded video, (ii) generating manifest and initialization data that can subsequently be used by user's client station to play back the video, and (iii) dividing the video into a number of segments. Still further, at a high level, streaming the prepared video to the user's client station may include sending, along with the (i) manifest and initialization data and (ii) video segments, other information related to the recorded video to the user's client station, such as video metadata and viewer feedback data. In turn, the front-end software running on the user's client station may use the (i) manifest and initialization data, (ii) video segments, (iii) other information related to the recorded video to present the recorded video to the user.

It should be understood that the back-end computing platform may perform some of the functions related to preparing the video and sending the video and other information to the user's client station in parallel. For instance, the back-end computing platform may send the video segments as they are created. In this way, the user's client station can begin presenting the video before it receives all of the video segments.

Further, as a recorded video is accessed and watched via the watch tool, the back-end computing platform hosting a SaaS application that incorporates the disclosed software technology may function to update the viewer metrics for the recorded video in any of various ways, which may enable up-to-date viewer metrics to be presented to the creating user of the video via the management tool. As one example, it is possible that the back-end computing platform may update the viewer metrics in response to certain user interactions with the disclosed software technology. For instance, when a new user accesses a recorded video for viewing, the back-end computing platform may update the viewer metric that relates to the list of viewers to include the new user. Further, as a user views the recorded video, the back-end computing platform may update the viewer metric that relates to how much of the recorded video has been watched. Even further, when a user interacts with a viewer feedback element, the back-end computing platform may update the viewer metric that relates to viewer feedback data. Still further, if or when a user finishes watching a recorded video, the back-end computing platform may update the viewer metrics to indicate that the user has finished watching the recorded video. The disclosed software technology may function to update the viewer metrics for the recorded video in other ways as well.

The disclosed software technology may facilitate various other functions and/or take various other forms as well. Further, it should be understood that the software tools described above are merely presented for purposes of illustration, and that the disclosed software technology may be implemented in the form of software tools that take various other forms as well. As one example to illustrate, it is possible that the functionality for enabling a creating user to access viewer metrics for a recorded video may be considered an aspect of the watch tool as opposed to the management tool, in which case the watch tool may provide both a viewer-facing interface for accessing and watching videos and a creator-facing interface for accessing viewer metrics of recorded videos. The disclosed software technology may take various other forms as well.

As such, the disclosed software technology improves upon existing technology by allowing recorded videos to be stored on a third-party cloud storage platform while still enabling viewers to watch the recorded videos via the SaaS application running on the user's client station in a seamless way that does not suffer from noticeable delays, stutters, or the like. Further, the disclosed software technology improves upon existing technology by providing creating users with viewer metrics that allows the creating users to accurately and effectively track viewer engagement with videos recorded using the disclosed software technology. Additionally, the disclosed software technology improves upon existing technology by allowing creating users to add one or more viewer feedback elements to recorded videos in a seamless way.

Accordingly, in one aspect, disclosed herein is a method that involves a computing platform (i) causing a first client station that is remote from the computing platform and is associated with a first user to present a first interface of the SaaS application that enables recording of videos, (ii) receiving, from the first client station, a given video that was recorded at the first client station utilizing the first interface, (iii) after receiving the given video, transmitting, a request for the given video to be stored at a third-party cloud storage platform that is remote from the computing platform, (iv) thereafter receiving, from a second client station that is remote from the computing platform and is associated with a second user, a communication indicating a request by the second user to watch the given video, and (v) after receiving the communication indicating the request by the second user to watch the given video: (a) causing the second client station to present a second interface of the SaaS application that enables watching of videos, (b) transmitting a request to obtain the given video from the third-party cloud storage platform, (c) as a result of transmitting the request to obtain the given video from the third-party cloud storage platform, receiving the given video from the third-party cloud storage platform, (d) dividing the given video into a sequence of video segments, and (e) streaming, by the computing platform, the sequence of video segments to the second client station for playback via the second interface of the SaaS application.

In some examples, the method further involves maintaining a set of one or more viewer metrics for the given video. In these examples, the set of one or more viewer metrics may comprise one or more of (i) a total number of views, (ii) an identification of viewers, (iii) a user's viewing progress, or (iv) responses to viewer feedback elements.

In other examples, the method further involves updating the set of one or more viewer metrics to indicate that the second user has begun watching the given video.

In yet other examples, the method further involves, updating the set of one or more viewer metrics to indicate the second user's viewing progress for the given video.

In still other examples, the method further involves (i) receiving, from the first client station, a communication indicating a request by the first user to review the set of one or more viewer metrics for the given video, and (ii) after receiving the communication indicating the request by the first user to review the viewer metrics for the given video, causing the first client station to present the set of one or more viewer metrics for the given video.

In additional examples, the method further involves, (i) receiving, from the first client station, a communication indicating a request by the first user to add one or more viewer feedback elements to the given video, and (ii) after receiving the communication indicating a request by the first user to add the one or more viewer feedback elements to the given video, creating and storing data representing the one or more viewer feedback elements for the given video. In these examples, the one or more viewer feedback elements may each comprise a set of respective pre-defined answers from which a user can choose.

In still additional examples, the method further involves after receiving the given video, creating a data record containing metadata for the given video. In these examples, the metadata for the given video contained within the data record may comprise one or more of (i) a length of the given video, (ii) a size of the given video, (iii) dimensions of the given video, or (iv) time information of the given video.

In another aspect, disclosed herein is a computing platform that includes a communication interface, at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable storage medium provisioned with software that is executable to cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 5 depicts an example message flow diagram for performing various management functions for videos that have been recorded using the disclosed software technology.

Figure 1:
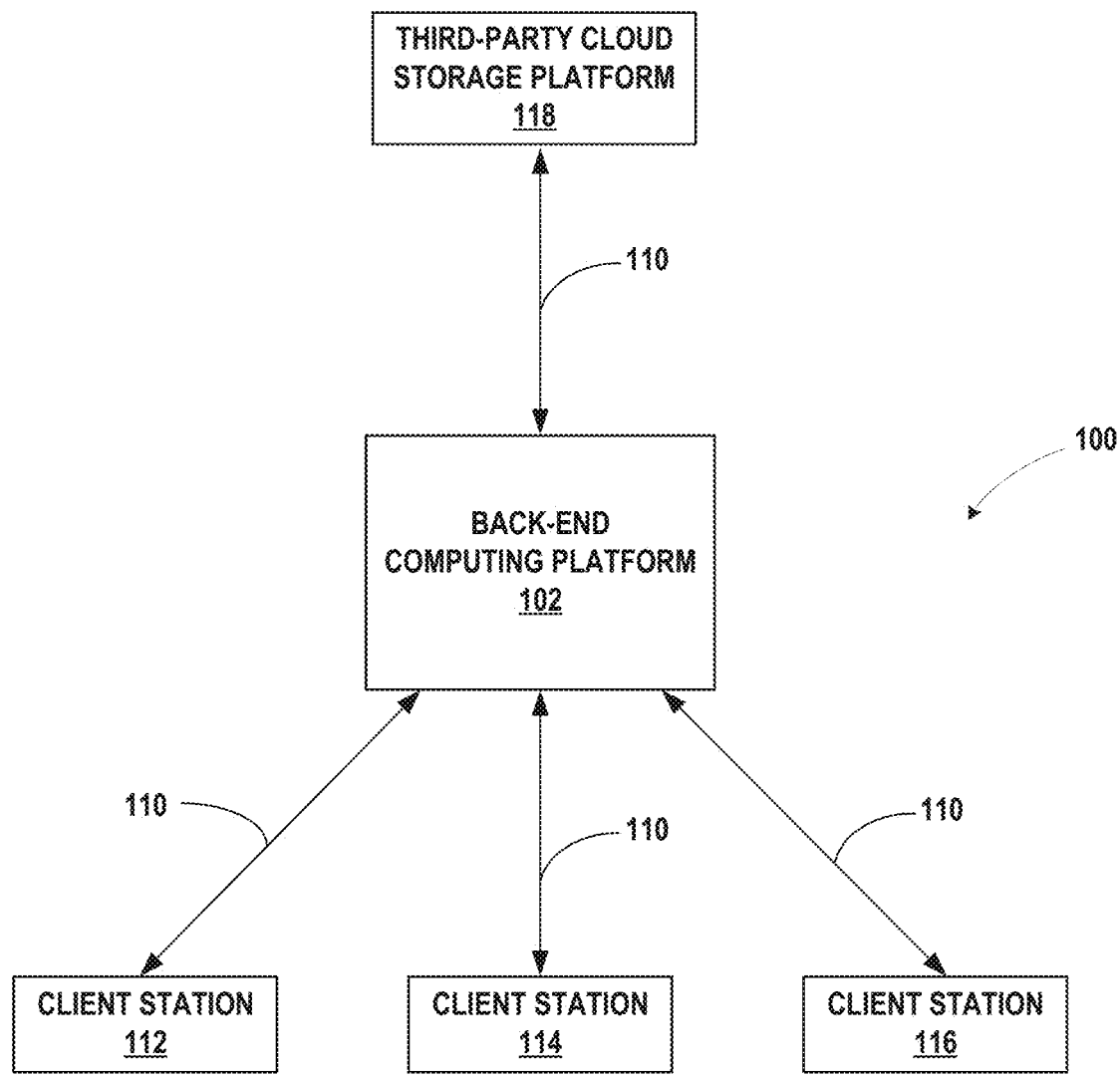
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, disclosed herein is software technology for recording, storing, sharing, managing, viewing, and/or interacting with videos that may be incorporated into an example software as a service (SaaS) application offered by a SaaS provider such as an independent software vendor (ISV). In this respect, the SaaS provider may operate a back-end computing platform that hosts the example SaaS application and delivers it to users over a data network such as the Internet, but as noted above and discussed further below, the recorded videos themselves will be stored at a third-party cloud storage platform (e.g., a cloud storage platform such as Google Drive, Microsoft OneDrive, Dropbox, Box, etc.) as opposed to the back-end computing platform hosting the example SaaS application—which may avoid the aforementioned drawbacks associated with storing user-recorded videos on such a back-end computing platform.

In general, the example SaaS application may include front-end software running on one or more client stations, which could take the form of a web application, a web browser extension, a native application (e.g., a mobile application), and/or a hybrid application, among other possibilities, as well as back-end software running on a back-end computing platform (sometimes referred to as a "cloud" platform) that interacts with and/or drives the front-end software. As described in further detail below, this front-end and back-end software may carry out various functions and take any of various forms.

I. Example System Configuration

Turning now to the figures, FIG. 1 depicts an example network configuration 100 in which example embodiments of the present disclosure may be implemented. As shown in FIG. 1, network configuration 100 includes a back-end computing platform 102 for a SaaS application that incorporates the disclosed software technology, which may be communicatively coupled to (i) one or more client stations, depicted here, for the sake of discussion, as client stations 112, 114, and 116, and (ii) at least one third-party cloud storage platform 118.

Broadly speaking, back-end computing platform 102 may comprise one or more computing systems that have been installed with back-end software (e.g., program code) for delivering the example SaaS application that incorporates the disclosed software technology to users over a data network. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been installed with back-end software for delivering the example SaaS application to users over a data network. In this respect, the SaaS provider that operates back-end computing platform 102 may either supply its own cloud infrastructure or may obtain cloud infrastructure from a third-party provider of "on demand" computing resources, such as Amazon Web Services (AWS) or the like. As another possibility, back-end computing platform 102 may comprise one or more dedicated servers that have been installed with back-end software for delivering the example SaaS application to users over a data network. Other implementations of back-end computing platform 102 are possible as well.

In turn, client stations 112, 114, and 116 may each be any computing device that is capable of running the front-end software disclosed herein. In this respect, client stations 112, 114, and 116 may each include hardware components such as a processor, data storage, a communication interface, and user-interface components (or interfaces for connecting thereto), among other possible hardware components, as well as software components that facilitate the client station's ability to run the front-end software disclosed herein (e.g., operating system software, web browser software, mobile applications, etc.). As representative examples, each of client stations 112, 114, and 116 may take the form of a desktop computer, a laptop, a netbook, a tablet, a smartphone, and/or a personal digital assistant (PDA), among other possibilities.

Further, broadly speaking, third-party cloud storage platform 118 may comprise one or more computing systems that function to provide a third-party cloud storage service to individual users and/or organizations. In this respect, third-party cloud storage platform 118 may comprise any third-party cloud storage platform now known or later developed, examples of which may include Google Drive, Dropbox, Microsoft OneDrive, and Box.

As further depicted in FIG. 1, back-end computing platform 102 may be configured to interact with client stations 112, 114, and 116 and third-party cloud storage platform 118 over respective communication paths 110. In this respect, each respective communication path 110 between back-end computing platform 102 and one of client stations 112, 114, and 116 or third-party cloud storage platform 118 may generally comprise one or more data networks and/or data links, which may take any of various forms. For instance, each respective communication path 110 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the data networks and/or links that make up each respective communication path 110 may be wireless, wired, or some combination thereof, and may carry data according to any of various different communication protocols. Although not shown, the respective communication paths 110 may also include one or more intermediate systems. For example, it is possible that back-end computing platform 102 may communicate with a given client station or given third-party cloud storage platform via one or more intermediary systems, such as a host server (not shown). Further, each respective communication path between back-end computing platform 102 and third-party cloud storage platform 118 may make use of an application programming interface (API) provided by the third-party cloud storage platform 118 in order to perform the disclosed functions of SaaS application. Many other configurations are also possible.

While FIG. 1 shows an arrangement in which three client stations and one third-party cloud storage platform are communicatively coupled to back-end computing platform 102, it should be understood that this is merely for purposes of illustration and that back-end computer platform 102 may interact with any number of client stations or third-party cloud storage platforms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Computing Platform

Figure 2:
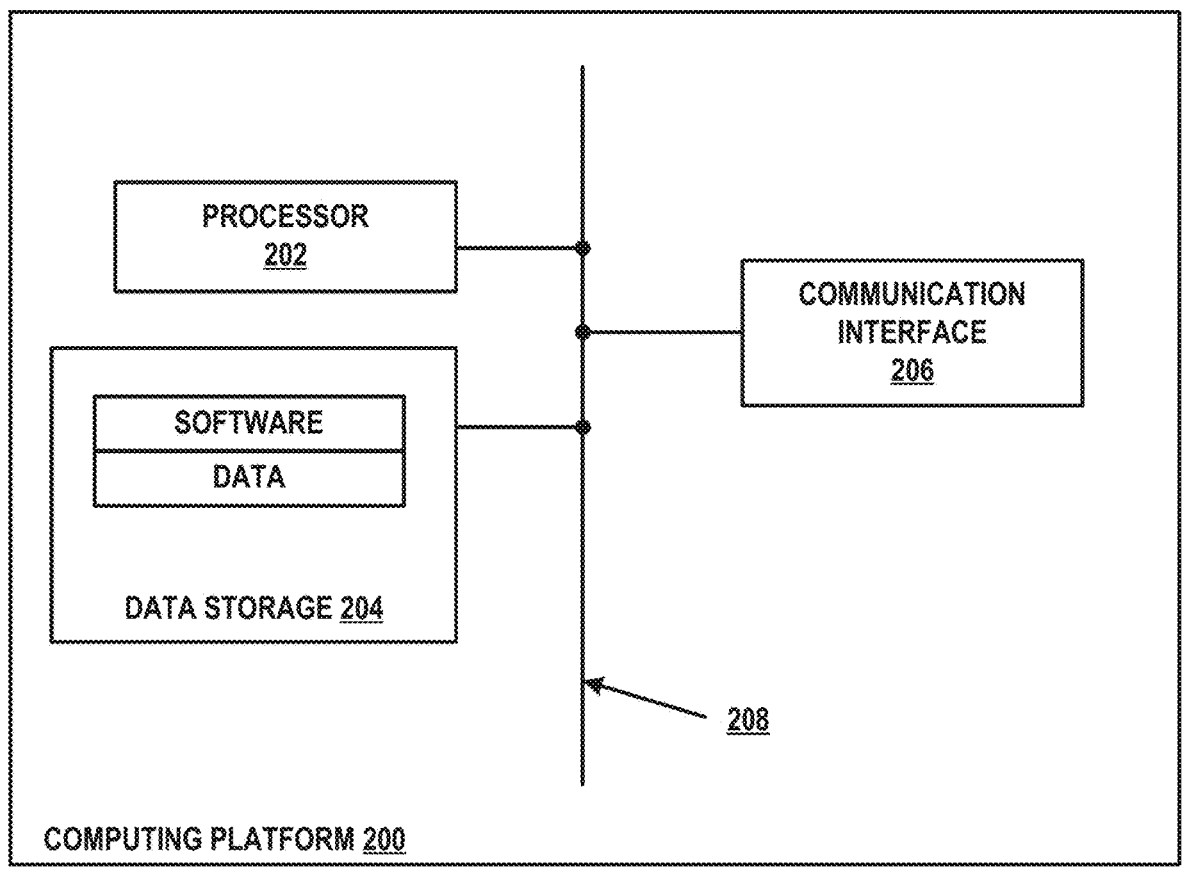
FIG. 2 depicts an example computing platform that may be configured to carry out one or more of the functions according to the disclosed software technology.

FIG. 2 is a simplified block diagram illustrating some structural components that may be included in an example computing platform 200, which could serve as, for instance, the back-end computing platform 102 of FIG. 1. In line with the discussion above, computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that computing platform 200 is configured to perform some or all of the disclosed functions, which may be arranged together into software applications, virtual machines, software development kits, toolsets, or the like, all of which are referred to herein as a software tool or software tools, and (ii) data that may be received, derived, or otherwise stored, for example, in one or more databases, file systems, or the like, by computing platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with client stations, such as one or more client stations 112, 114, or 116 of FIG. 1, and/or third-party cloud storage platforms, such as third-party cloud storage platform 118. Additionally, in an implementation where computing platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication. Communication interface 206 may also include multiple communication interfaces of different types. Other configurations are possible as well.

Although not shown, computing platform 200 may additionally include or have an interface for connecting to user-interface components that facilitate user interaction with computing platform 200, such as a keyboard, a mouse, a trackpad, a display screen, a touch-sensitive interface, a stylus, a virtual-reality headset, and/or speakers, among other possibilities.

It should be understood that computing platform 200 is one example of a computing platform that may be used with the embodiments described herein. Numerous other arrangements are possible and contemplated herein. For instance, other computing platforms may include additional components not pictured and/or more or fewer of the pictured components.

Further, as noted above, a client station that interacts with back-end computing platform 102 (e.g., client station 112, 114, or 116), as well as a third-party cloud storage platform (e.g., third-party cloud storage platform 118), may include similar components to computing platform 200.

III. Example Operations

As mentioned above, disclosed herein is new software technology for recording, storing, sharing, managing, viewing, and/or interacting with videos that may be incorporated into an example SaaS application offered by a SaaS provider such as an ISV), which may operate a back-end computing platform that hosts the SaaS application and delivers it to users over a data network such as the Internet.

At a high level, the example SaaS application that incorporates the disclosed technology may provide a user interested in creating videos (referred to herein as a "creating user" or "creator") with the ability to (i) record a video on the user's client station, (ii) have the recorded video stored at a third-party cloud storage platform (e.g., a cloud storage platform such as Google Drive, Microsoft OneDrive, Dropbox, Box, etc. with which the creating user has a user account) as opposed to the back-end computing platform hosting the example SaaS application (which may avoid the drawbacks associated with storing user-recorded videos on such a back-end computing platform), (iii) make the recorded video available for access by other users, and/or (iv) perform various management functions for the recorded video, and correspondingly, the disclosed software technology may then provide a user interested in watching videos (referred to herein as a "watching user" or a "viewer") with the ability to access, watch, and perhaps also interact with the recorded video.

The disclosed software technology may comprise various software tools that facilitate the above functionality, which may be implemented either individually or in combination. Each of these software tools may take various forms, and examples of such software tools will now be described in further detail. It should be understood that these example software tools described herein are merely presented for purposes of illustration, and that the disclosed software technology may be implemented in the form of software tools that take various other forms as well. The disclosed software technology may facilitate various other functions and/or take various other forms as well.

a. First Software Tool

According to a first aspect, the disclosed software technology may comprise a first software tool that enables a creating user to record a video on the user's client station and then have the video stored at a third-party cloud storage platform for future access (e.g., a cloud storage platform such as Google Drive, Microsoft OneDrive, Dropbox, Box, etc. with which the creating user has a user account) as opposed to the back-end computing platform hosting the SaaS application that incorporates the first software tool. This first software tool may be referred to herein as the "record tool."

Figure 3:
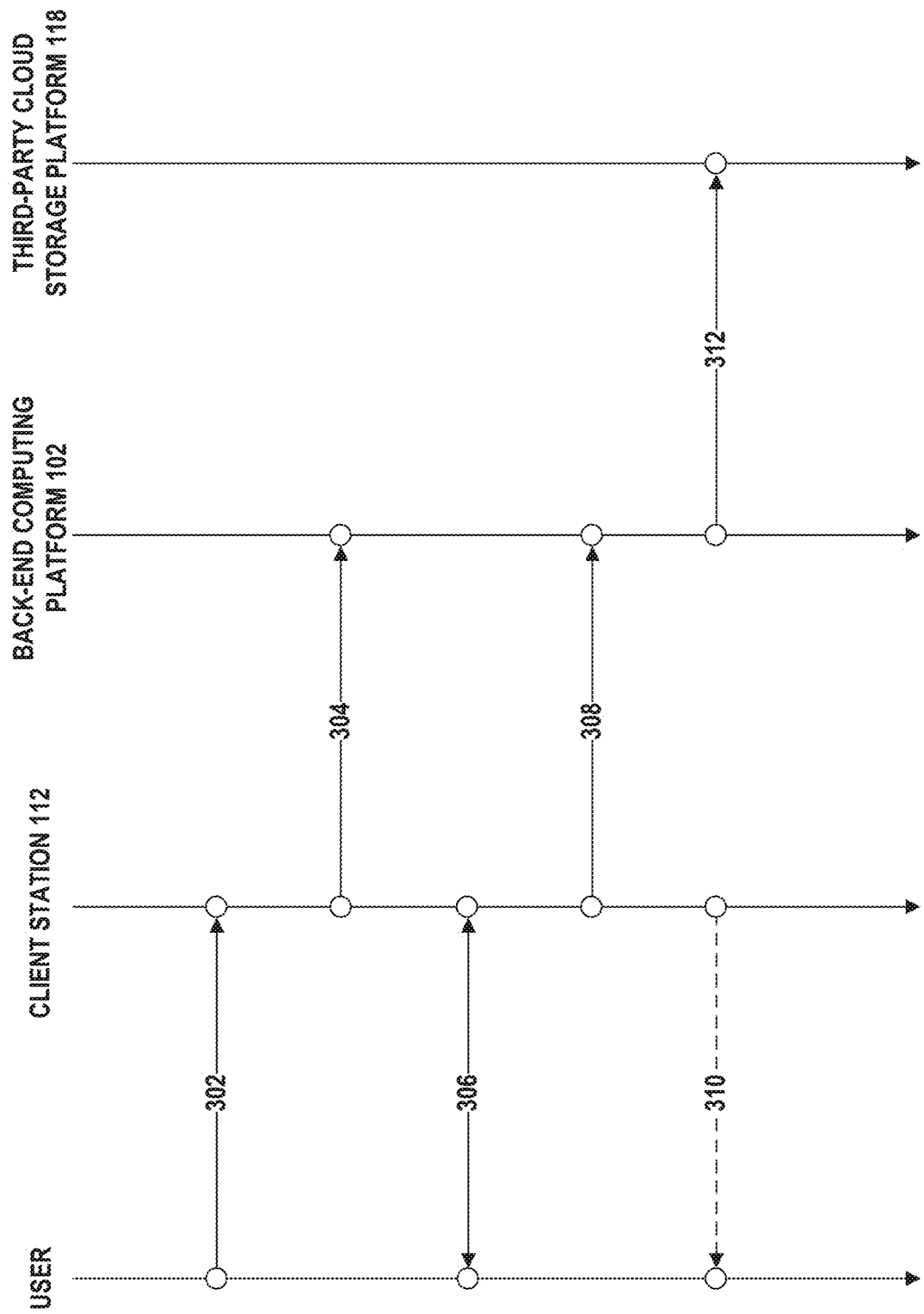
FIG. 3 depicts an example message flow diagram for recording a video and adjusting sharing settings of the video using the disclosed software technology.

FIG. 3 illustrates some example functions that may be carried out in accordance with the record tool. For the purposes of illustration only, the example functions are described as being carried out within the example network configuration 100 of FIG. 1, which includes client station 112, back-end computing platform 102, and third-party cloud storage platform 118. Further, it should be understood that the flow diagram illustrated in FIG. 3 is merely described in such a manner for the sake of clarity and explanation and that some functions may be carried out in various other manners as well, including the possibility that example functions may be added, removed, rearranged into different orders, grouped together, and/or not grouped together at all.

According to one example embodiment in which the disclosed software technology has been incorporated into a SaaS application, a user may, at block 302, input a request to access the record tool, which is received by client station 112. The user may input the request in various ways. As one possibility, the user may input the request via a front-end interface of the SaaS application. In this respect, the front-end interface may provide the user with a selectable element through which the user can submit the request (e.g., via a web application, a browser extension, a native application, etc.). In turn, the user may submit the request by interacting with the selectable element. The user may input the request in other ways as well.

At block 304, after receiving the user request, client station 112 may then present a front-end interface for the record tool. In this respect, depending on the nature of the front-end software for the SaaS application that incorporates the disclosed record tool, the function of presenting the front-end interface for the record tool in response to the user request may take various forms.

For instance, in some implementations, client station 112 may be installed with front-end software for the SaaS application (e.g., a web browser extension or a mobile application) that enables client station 112 to present the front-end interface for the record tool without requiring any interaction with back-end computing platform 102.

In other implementations, the capability of client station 112 to present the front-end interface for the record tool may be driven by the client station's interaction with back-end platform 102. For example, after receiving the user request, client station 112 may first send a communication to back-end computing platform 102 indicating the user's request to access the record tool, which is subsequently received by back-end computing platform 102. The communication may take various forms. As one possibility, the communication may include information related to the user that can be used by back-end computing platform 102 to authenticate the user's account with the SaaS platform. In this respect, the user may have previously created an account with the SaaS platform that enables the user to access the record tool. The communication may take other forms as well.

After receiving the communication from client station 112, back-end computing platform 102 may then in turn send a communication to client station 112 that causes client station 112 to present the front-end interface for the record tool. The communication make take various forms. As one possibility, the communication make include instructions configured to, when executed by client station 112, cause client station 112 to present the front-end interface for the record tool. The communication may take other forms as well.

The function of presenting the front-end interface for the record tool in response to the user request may take various other forms as well.

Figure 4A:
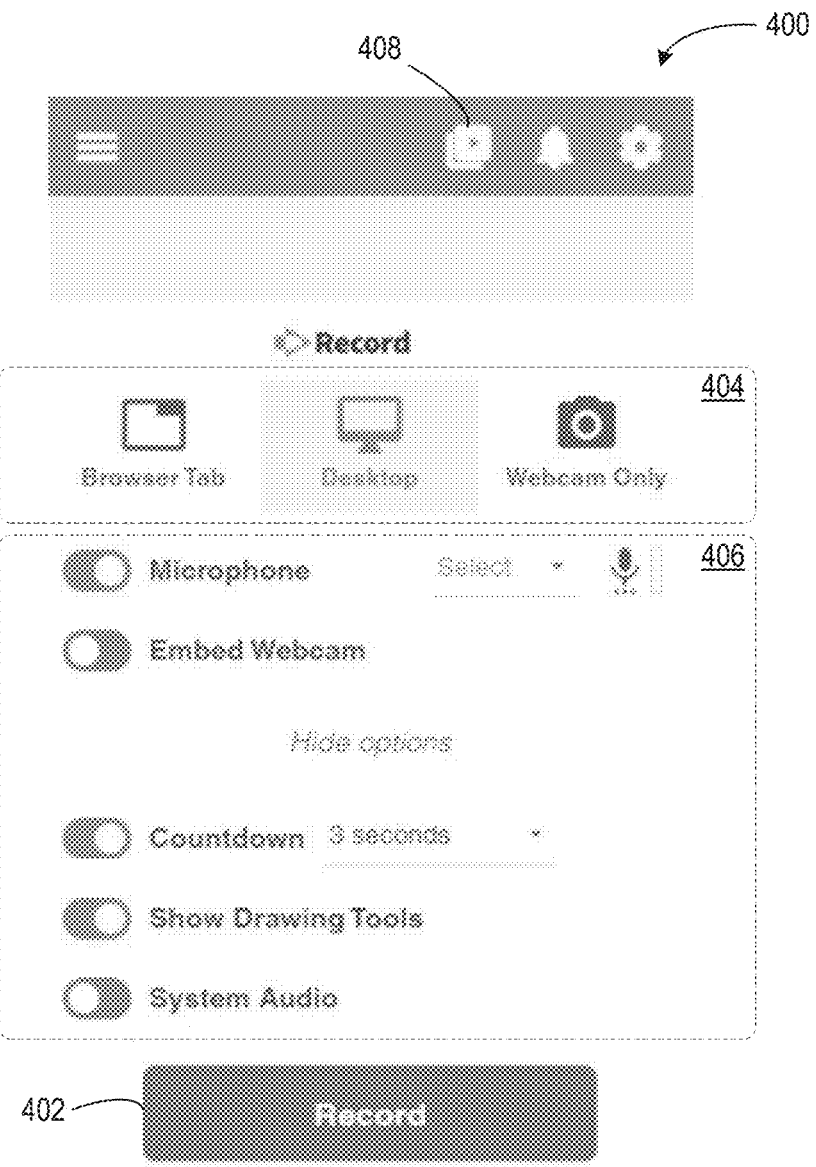
FIG. 4A depicts an example view of a front-end interface that may be presented to a user to record a video using the disclosed software technology.

Further, the front-end interface of the disclosed record tool can take any of various forms. As one example to illustrate, FIG. 4A depicts an example view 400 of a front-end interface that may be presented to a creating user who desires to record a video. The front-end interface may be presented in various ways, examples of which include presenting the front-end interface as part of an extension within a web browser, as part of a standalone webpage, or as part of a page within a mobile application, among other possibilities. As shown, example view 400 includes a selectable record element 402, a selectable source selector 404, a recording settings pane 406, and a selectable "Prior Recordings" element 408.

In general, selectable record element 402 may enable a user to initiate the record tool to begin recording a video. In this respect, when the user selects selectable record element 402, this causes client station 112 to apply one or more video settings, record the video, and store the recorded video on a storage device of client station 112. In practice, selectable record element 402 may take any of various visual forms, including but not limited to the example form shown in FIG. 4A.

In general, selectable source selector 404 may enable a user to select one or more video sources from which to record using the record tool. In this respect, selectable source selector 404 may display one or more video sources from which the user can select to record. For instance, as shown in FIG. 4A, a user can select from "Browser Tab," "Desktop," or "Webcam Only" as the video source to record. Further, when the user selects a video source displayed within selectable source selector 404, this causes client station 112 to perform various functions depending on the selected video source. As one example, if the user selects "Browser Tab," client station 112 may function to record a video of the user's currently open web browser tab, effectively excluding all other activity on the screen of client station 112. As another example, if the user selects "Desktop," client station 112 may function to record a video of the user's entire desktop, which may effectively capture all activity that can be seen on the screen of client station 112. As yet another example, if the user selects "Webcam Only," client station 112 may function to record a video using only the user's webcam, effectively ignoring any activity happening on the screen of client station 112. It should be understood that while "Browser Tab," "Desktop," or "Webcam Only" are some examples of video sources from which client station 112 may record, there may be additional video sources as well. In practice, selectable source selector 404 may take any of various visual forms, including but not limited to the example form shown in FIG. 4A.

In general, recording settings pane 406 may enable a user to adjust one or more settings that affect the video recording. In this respect, recording settings pane 406 may display one or more video settings that the user can adjust. For instance, as shown in FIG. 4A, a user can enable or disable video capture settings such as (i) whether to record audio input from a microphone peripheral device connected to client station 112, (ii) whether to embed video input from a webcam peripheral device connected to client station 112, (iii) whether to implement a countdown (and if yes, the length of the countdown) before the recording is initiated, (iv) whether to display various annotation tools while the video is recording, and (v) whether to record audio input from system operations associated with client station 112 (e.g., system notification sounds, error sounds, etc.). Further, when a user enables or disables a video setting through recording settings pane 406, this causes client station 112 to update the front-end interface to reflect the user's action and apply the enabled video settings to the recording when the user selects the selectable record element 402. In practice, recording settings pane 406 may take any of various visual forms, including but not limited to the example for shown in FIG. 4A.

In general, selectable "Prior Recordings" element 408 may enable a user to launch a different front-end interface that displays the user's previously recorded videos, to the extent there are any. In this respect, when the user selects the selectable "Prior Recordings" element 408, this causes client station 112 to present the different front-end interface. The different front-end interface may also be presented in various ways, examples of which include presenting the front-end interface as part of an extension within a web browser, as part of a standalone webpage, or as part of a page within a mobile application, among other possibilities. The different front-end interface may also be the interface that is presented in conjunction with the management tool, which is described in further detail below. In practice, selectable "Prior Recordings" element 408 may take any of various visual forms, including but not limited to the example form shown in FIG. 4A.

Turning back to FIG. 3, the user may, at block 306, interact with the front-end interface of the record tool in order to record a video. In this respect, the user's interaction with the front-end interface of the SaaS application may cause client station 112 to apply a number of video capture and advanced video configuration settings, such as the ones described above with respect to FIG. 4A, and begin recording the video. Client station 112 may record the video in various ways. As one possibility, client station 112 may capture its video and/or audio output in accordance with the selected video settings to send to back-end computing platform 102. Client station 112 may record the video in other ways as well.

Further, while client station 112 is recording the video, client station 112 may present a front-end interface that provides the user with a view of what client station 112 is recording. The view of this front-end interface may take various forms depending on the video capture and advanced video configurations settings selected by the user as described above with respect to FIG. 4A. As one possibility, if the user indicated that the user desires client station 112 to display annotation tools while the video is recording, client station 112 may present one or more user-selectable annotation tools as part of the view of the front-end interface.

Figure 4B:
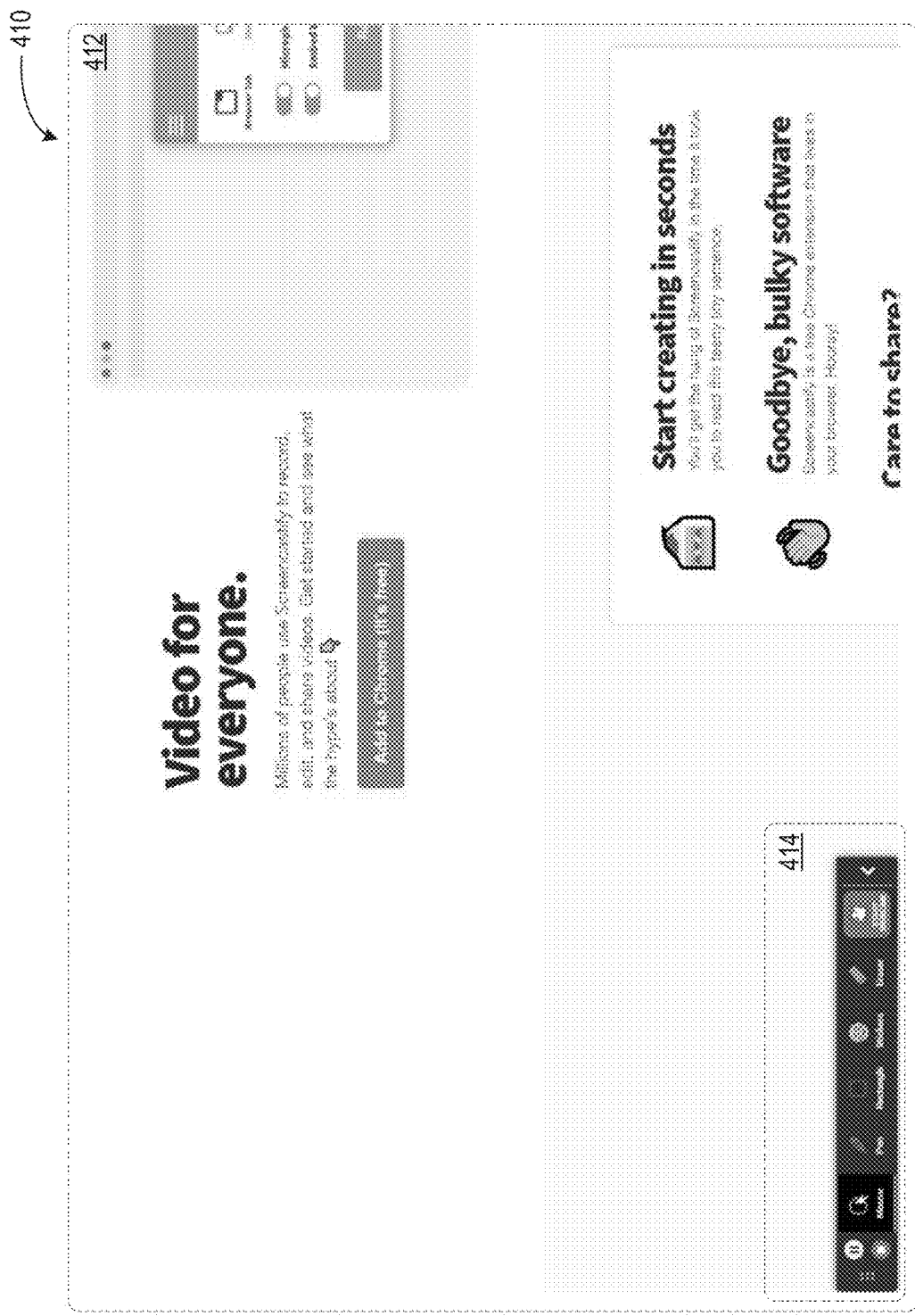
FIG. 4B depicts an example view of a front-end interface that may be presented to a user to annotate the video while the video is recording using the disclosed software technology.

As one example to illustrate, FIG. 4B depicts an example view 410 of a front-end interface that may be presented to a creating user while the video is being recorded. The front-end interface may be presented in various ways, examples of which include presenting the front-end interface as part of an extension within a web browser, as part of a standalone webpage, or as part of a page within a mobile application, among other possibilities. As shown, example view 410 includes a video capture pane 412 and an annotations pane 414.

In general, video capture pane 412 may enable a user to preview the video source that is being captured. In this respect, the material that is shown within video capture pane 412 may be representative of what client station 112 is currently recording. Additionally, video capture pane 412 may display one or more annotations made by the user while the video is recording via annotations pane 414, which is described in further detail below. In practice, video capture pane 412 may take any of various visual forms, including but not limited to the example form shown in FIG. 4B.

In general, annotations pane 414 may enable a user to add one or more annotations to the video that is being captured. For instance, as shown in FIG. 4B, a user can select from a "Mouse," "Pen," "Rectangle," "Sticker," or "Eraser" annotation tool. In this respect, when the user selects one of the annotation tools available in annotations pane 414, this causes client station 112 to initiate the selected annotation tool, allowing the user to then apply a respective annotation to the video that is being captured. As one example, if the user selects the "Mouse" annotation tool, this causes client station 112 to initiate the "Mouse" annotation tool, which in turn allows the user to click anywhere within the video capture pane 412 to add a circle around the user's cursor. This may be beneficial insofar that it may allow the creating user to indicate to a user where the user's cursor is at certain points through the recorded video. As another example, if the user selects the "Pen" annotation tool, this causes client station 112 to initiate the "Pen" annotation tool, which in turn allows the user to freehand draw any shapes on top of the video being recorded and shown within video capture pane 412. As yet another example, if the user selects the "Rectangle" annotation tool, this causes client station 112 to initiate the "Rectangle" annotation tool, which in turns allows the user to draw a rectangle around an area of the video capture pane 412. As still another example, if the user selects the "Sticker" annotation tool, this causes client station 112 to initiate the "Sticker" annotation tool, which in turn allows the user to add one or more predefined stickers to an area of the video capture pane 412. The one or more predefined stickers may take various forms, examples of which may include emojis, graphics, or the like. As yet still another example, if the user selects the "Eraser" annotation tool, this causes client station 112 to initiate the "Eraser" annotation tool, which in turn allows the user to remove all or part of previously made annotations that are displayed within video capture pane 412. In practice, annotations pane 414 may take any of various visual forms, including but not limited to the example form shown in FIG. 4B.

Turning back to FIG. 3, client station 112 may detect that the recording of the video has completed. Client station 112 may detect that the recording of the video has completed in various ways. As one possibility, the user may provide user input via the front-end interface of the SaaS application running on client station 112 that indicates a desire to stop recording of the video via the record tool. In this respect, client station 112 may detect the user input and subsequently determine that the recording is completed. Client station 112 may detect that the recording of the video has completed in other ways as well.

At block 308, client station 112 may send the recorded video to back-end computing platform 102 along with a request to store the recorded video. The request may take various forms. As one example, the request may include one or more permission settings that back-end computing platform 102 may use in storing the recorded video. The one or more permission settings are described in further detail below. The request may take other forms as well.

Alternatively, client station 112 may send the recorded video to third-party cloud storage platform 118 with a request to store the recorded video. The request may take various forms. As one example, the request may include one or more permission settings that third-party cloud storage platform 118 may use in storing the recorded video. The request may take other forms as well.

At block 310, client station 112 may optionally present the user with one or more options for sharing the recorded video. In this respect, client station 112 may present the user with a view of the front-end interface of the SaaS application through which the user can adjust one or more options for sharing the recorded video.

Figure 4C:
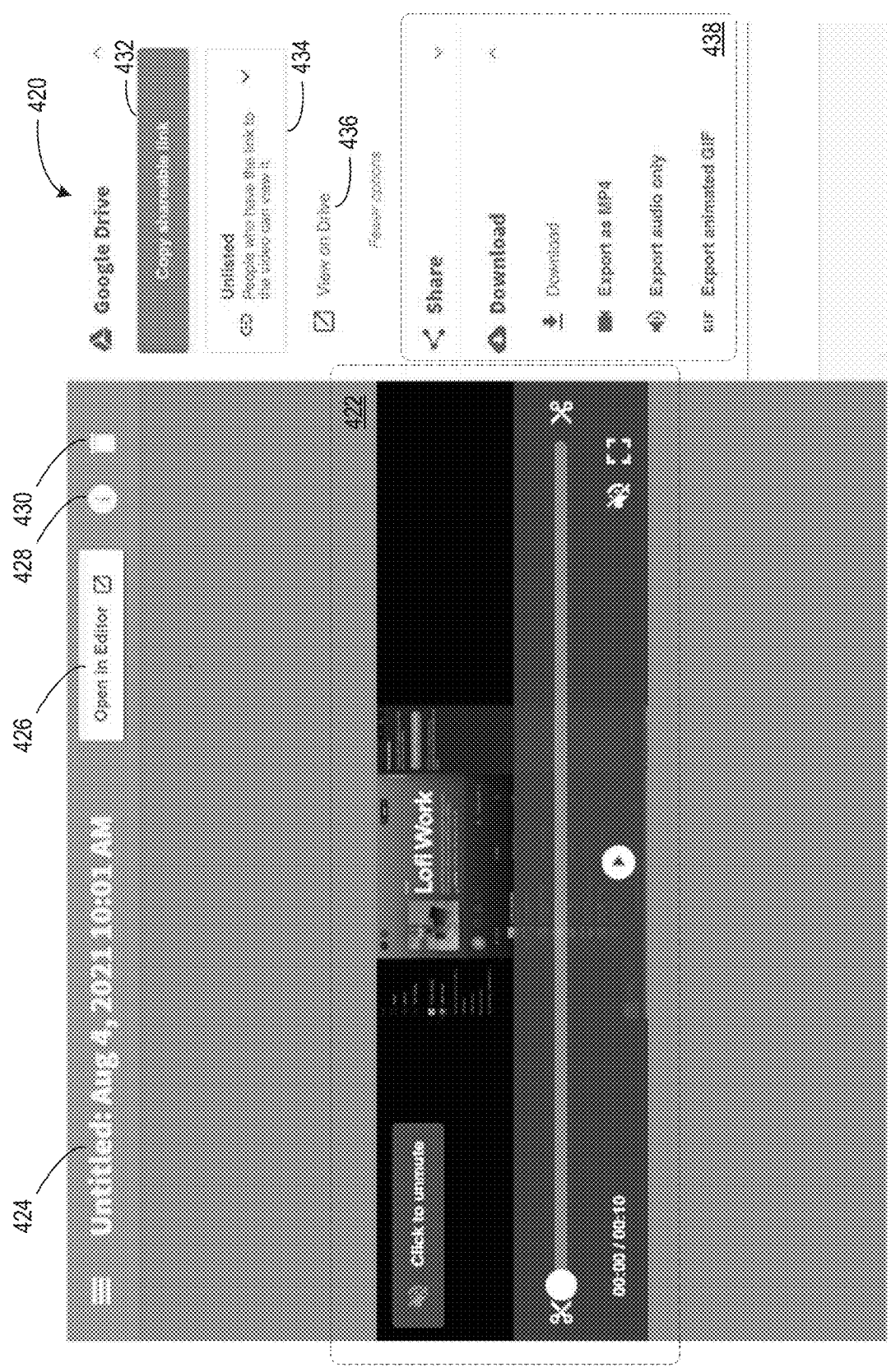
FIG. 4C depicts an example view of a front-end interface that may be presented to a user for adjusting sharing settings of the video using the disclosed software technology.

As one example to illustrate, FIG. 4C depicts an example view 420 of a front-end interface that may be presented to a creating user once the video is finished recording. As shown, example view 420 includes a video preview pane 422, a title field 424, a selectable editor element 426, a selectable video details element 428, a selectable delete element 430, a selectable share element 432, a share settings element 434, a selectable cloud storage element 436, and a sharing pane 438.

In general, video preview pane 422 may enable a user to review and perform certain editing actions on the video prior to sharing the video with viewers. In this respect, when the user interacts with video preview pane 422, this causes client station 112 to present a preview of the recorded video along with various selectable elements that enable a user to quickly seek through the video and/or perform a cutting action on the video in order to remove excess video if the recording started too soon or went on too long. In practice, video preview pane 422 may take any of various visual forms, including but not limited to the example form shown in FIG. 4C.

In general, title field 424 may enable a user to provide a title for the recorded video. In this respect, when the user selects title field 424, this causes client station 112 to present the user with a user-definable field through which the user can provide a new title. In some instances, title field 424 may provide a default title, which may take various forms, one example of which indicates the date and time the video was recorded. For instance, as shown in FIG. 4C, title field 424 has been populated with a default title that is the "Untitled: Aug. 4, 2021 10:01 AM." In practice, title field 424 may take any of various visual forms, including but not limited to the example form shown in FIG. 4C.

In general, selectable editor element 426 may enable a user to perform certain editing actions to the recorded video. In this respect, when the user selects selectable editor element 426, this causes client station to display a different front-end interface of the SaaS application that includes certain editing tools that enable a user to perform more in-depth editing functions to the video prior to sharing with viewers. The editing functions may take various forms, examples of which may include (i) cropping the video, (ii) cutting portions of the video, (iii) zooming into certain areas of the video, (iv) blurring portions of the video, (v) adding text to the video, and/or (vi) deleting the video, among others. In practice, selectable editor element 426 may take any of various visual forms, including but not limited to the example form shown in FIG. 4C.

In general, selectable video details element 428 may enable a user to view details about the recorded video. In this respect, when a user selects selectable video details element 428, this causes client station 112 to display a different front-end interface of the SaaS application includes certain video details about the recorded video to the user. The video details may take various forms, examples of which include (i) the duration of the video, (ii) the date and time the video was recorded, (iii) the dimensions of the video (e.g., 720× 540 pixels), and (iv) the size of the video file, among others. In practice, selectable video details element 428 may take any of various visual forms, including but not limited to the example form shown in FIG. 4C.

In general, selectable delete element 430 may enable a user to delete the recorded video. In this respect, when the user selects the selectable delete element 430, this causes client station 112 to delete the recorded video. In practice, selectable record element 402 may take any of various visual forms, including but not limited to the example form shown in FIG. 4C.

In general, selectable share element 432 may enable a user to share the recorded video with other users. In this respect, when the user selects selectable share element 432, this causes client station 112 to generate a uniform resource locator (URL) that can subsequently be shared to grant other users access to the recorded video. In turn, a viewer can use the provided URL to access and view the recorded video. Further, using the provided URL may to cause third-party cloud storage platform 118 to make the recorded video accessible to the viewer. The process for accessing and viewing the video is further described below with respect to FIG. 7. In practice, selectable share element 432 may take any of various visual forms, including but not limited to the example form shown in FIG. 4C.

In general, share settings element 434 may enable a user to define one or more permissions associated with the recorded video. In this respect, when the user selects share settings element 434, this causes client station 112 to provide the user with one or more share settings that the user can select to make the video (i) private, where only the creating user will be able to view the video, (ii) public, where anyone can search for and subsequently view the video, or (iii) unlisted, where only viewers that have the URL generated using selectable share element 432 can access and view the video. In practice, share settings element 434 may take any of various visual forms, including but not limited to the example form shown in FIG. 4C.

In general, selectable cloud storage element 436 may enable a user to view the recorded video via an interface or webpage operated by third-party cloud storage platform 118. In this respect, when a user selects selectable cloud storage element 436, this causes client station 112 to open a webpage operated by third-party cloud storage platform 118 where the user can view the recorded video. In practice, selectable cloud storage element 436 may take any of various visual forms, including but not limited to the example form shown in FIG. 4C.

In general, sharing pane 438 may enable a user to select one or more options to share and/or download the recorded video. For instance, sharing pane 438 may enable the user to select one or more sharing options such as (i) publishing the video to an online video sharing platform, such as YOU-TUBE®, (ii) retrieving an embed code that the creating can use to embed the recorded video into a webpage, and/or (iii) sharing the recorded video through email, among others. Further, sharing pane 438 may enable the user to select one or more downloading options such as (i) downloading the video file to the data storage of client station 112 where it can be later viewed and accessed by the creating user, (ii) exporting the video file in a particular file format, such as MP4, (iii) exporting only the audio track of the recorded video, and/or (iv) exporting the video file as an animated GIF, among others. In this respect, when the user selects a sharing or downloading option, this causes client station 112 to execute the selected option. In practice, sharing pane 438 may take any of various visual forms, including but not limited to the example form shown in FIG. 4C.

Turning back to FIG. 3, at block 312, after receiving the recorded video from client station 112, back-end computing platform 102 may send the recorded video to third-party cloud storage platform 118 along with a request to store the recorded video, which in turn causes third-party cloud storage platform 118 to store the recorded video.

Alternatively, as described above, client station 112 may send the recorded video along with a request to store the recorded video to third-party cloud storage platform 118 directly. In this scenario, back-end computing platform 102 may not receive the recorded video from client station 112.

The file type of the recorded video may take various forms, examples of which may include MP4, MPEG, MOV, WMV, AVI, AVCHD, FLV, F4V, and/or SWF, among others.

The request to store the recorded video may take various forms as well. As one possibility, the request may include information identifying the creating user's account associated with third-party cloud storage platform 118. In this respect, the creating user may have previously configured a user account with third-party cloud storage platform 118. For example, the user may be required, as part of setting up an account to access the SaaS application, to (i) create a user account (e.g., a Google Drive account) with third-party cloud storage platform 118 or (ii) indicate user account information for a previously-created account with third-party cloud storage platform 118. The request to store the recorded video may take other forms as well. In turn, third-party cloud storage platform 118 may use this information to carry out storing the recorded video.

Third-party cloud storage platform 118 may, after storing the recorded video, send a communication to back-end computing platform 102 indicating that the video has successfully been stored. The communication may take various forms. As one possibility, the communication may include an identifier of the video at third-party cloud storage platform 118. The communication may take other forms as well.

After receiving the recorded video from client station 112, back-end computing platform 102 may also create and store a data record for the recorded video at back-end computing platform 102. The data record may take various forms. As one example, the data record may include (i) an identifier indicating the user that recorded the video, (ii) video metadata (e.g., length, size, and dimensions of the video, as well as the time and date the video was recorded), (iii) a third-party cloud storage identifier for the video, which may be assigned by third-party cloud storage platform 118, (iv) permissions for the video, (v) viewer feedback element data (e.g., quiz question data), and (vi) viewer feedback data (quiz answer data). The data record may take other forms as well. Further, it should be understood that certain fields of the created data record may not be populated by back-end computing platform 102 until certain actions are taken by the user. These actions may take various forms and are described below with respect to the management and watch tools.

It should be understood that the functions described above in relation to the record tool are merely provided as examples, and it is possible that the record tool could facilitate various other tasks related to recording a video as well.

b. Second Software Tool

According to a second aspect, the disclosed software technology may comprise a second software tool that enables a creating user to perform various management functions for videos that have been recorded via the record tool and stored at a third-party cloud storage platform, examples of which may include defining sharing settings for a recorded video, adding viewer feedback elements (e.g., quiz questions, polls, or the like) to a recorded video, and/or accessing viewer metrics for a recorded video (e.g., number of views, identification of viewers, most recent views, percentage of the video watched on a user-by-user basis, viewer responses to quiz questions, polls, or the like, etc.), among other possibilities. This second software tool may be referred to herein as the "management tool."

FIG. 5 illustrates some example functions that may be carried out in accordance with the management tool. For the purposes of illustration only, the example functions are described as being carried out within the example network configuration 100 of FIG. 1, which includes client station 112, back-end computing platform 102, and third-party cloud storage platform 118. Further, it should be understood that the flow diagram illustrated in FIG. 5 is merely described in such a manner for the sake of clarity and explanation and that some functions may be carried out in various other manners as well, including the possibility that example functions may be added, removed, rearranged into different orders, grouped together, and/or not grouped together at all.

According to one example embodiment in which the disclosed software technology has been incorporated into a SaaS application, a user may, at block 502, input a request to access the management tool, which is received by client station 112. The user may input the request in various ways. As one possibility, the user may input the request via a front-end interface of the SaaS application. In this respect, the front-end interface may provide the user with a selectable element through which the user can submit the request (e.g., via a web application, a browser extension, a native application, etc.). In turn, the user may submit the request by interacting with the selectable element.

At block 504, after receiving the user request, client station 112 may send a communication to back-end computing platform 102 indicating the user's request to access the management tool, which is subsequently received by back-end computing platform 102. The communication may take various forms. As one possibility, the user's request may include information related to the user that can be used by back-end computing platform 102 to authenticate the user's account with the SaaS platform. In this respect, the user may have previously created an account with the SaaS platform that enables the user to access the record tool. The communication may take other forms as well.

At block 506, after receiving the communication from client station 112, back-end computing platform 102 may send a communication to client station 112 that causes client station 112 to present a front-end interface for the management tool. The communication make take various forms. As one possibility, the communication make include instructions configured to, when executed by client station 112, cause client station 112 to present the front-end interface for the management tool. The communication may take other forms as well.

At block 508, after receiving the communication from back-end computing platform 102, client station 112 may present a front-end interface for the management tool. This front-end interface can take any of various forms. As one example, the front-end interface may include a listing of the user's previously-recorded videos along with information related to each video. The information related to each video make take various forms, examples of which include (i) the title of the video, (ii) the length of the video, and (iii) the size of the video. The front-end interface can take other forms as well.

Figure 6A:
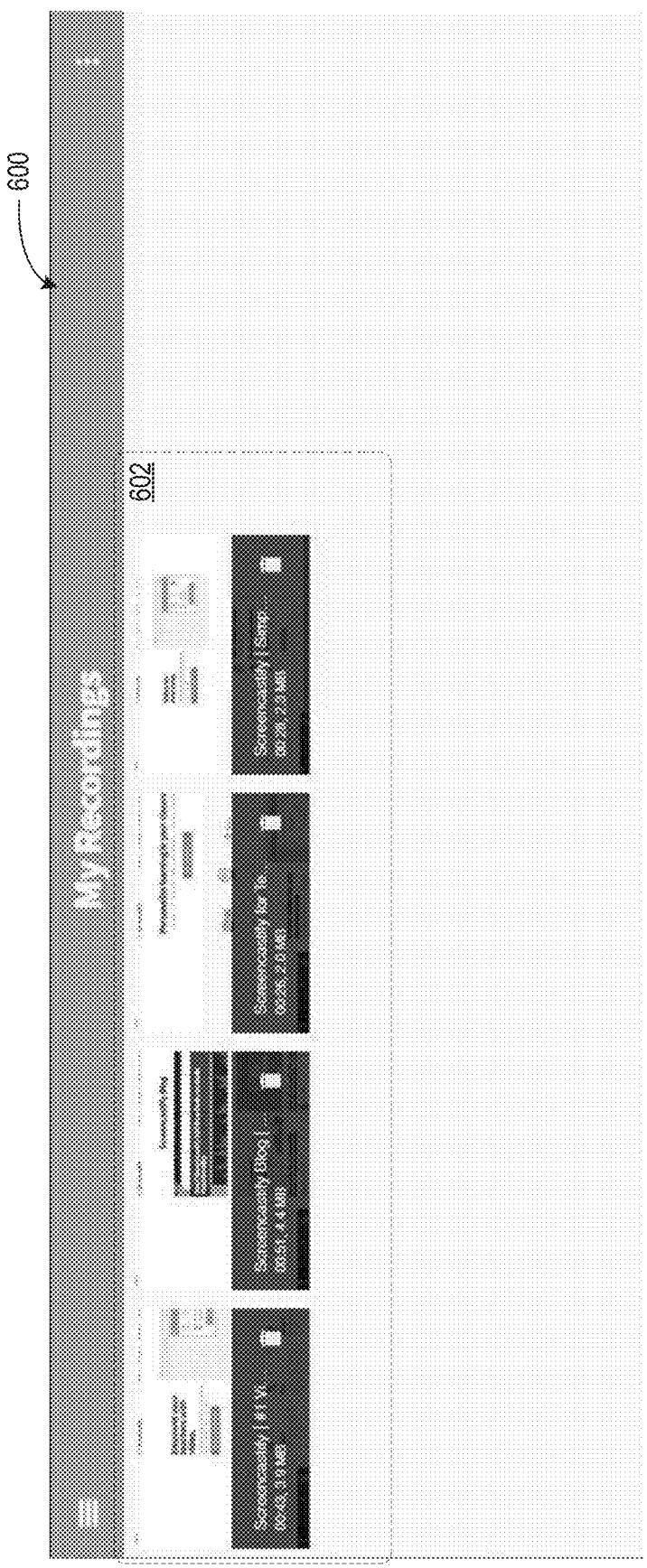
FIG. 6A depicts an example view of a front-end interface that may be presented to a user to view videos recorded using the disclosed software technology.

As one example to illustrate, FIG. 6A depicts an example view 600 of a front-end interface that may be presented to a creating user who desires to manage previously recorded videos. Further, client station 112 may present the front-end interface in various ways, examples of which include presenting the front-end interface as part of an extension within a web browser, as part of a standalone webpage, or as part of a page within a mobile application, among other possibilities. As shown, example view 600 includes a recorded videos pane 602.

In general, recorded videos pane 602 may enable a user to (i) view previously-recorded videos, (ii) view details related the previously-recorded videos, and (iii) select a video to manage. The details related to the previously-recorded videos may take various forms, examples of which include (i) the title of the video, (ii) the length of the video, (iii) the size of the video, and (iv) viewer metrics. In this respect, when the user selects one of the previously-recorded videos, this causes client station 112 to display a different view of the front-end interface that enables a user to manage the selected video, which is described in further detail below. In practice, recorded videos pane 602 may take any of various visual forms, including but not limited to the example form shown in FIG. 6A.

Turning back to FIG. 5, while the front-end interface of the management tool is presented by client station 112, the user may, at block 510, input a request to manage a given video. The user may input the request in various ways. As one example, the user may input the request through selecting a given video from the list of previously-recorded videos. The user may input the request in other ways as well.

At block 512, after receiving the user's request, client station 112 may access and present a front-end interface for the management tool. This function of accessing and presenting the front-end interface for the management tool may take various forms, and at least in some implementations, may involve interaction with back-end computing platform 102. For example, in response to receiving the user's request, client station 112 may send a communication to back-end computing platform 102 indicating the user's request to manage the given video, which is subsequently received by back-end computing platform 102. The communication may take various forms. As one possibility, the communication may include an identification of the given video, which in turn may allow back-end computing platform 102 to cause client station 112 to present the correct video to the user. The communication may take other forms as well.

At block 514, after receiving the communication from client station 112, back-end computing platform 102 may send a communication to client station 112 that causes client station 112 to present another front-end interface of the management tool that allows the user to manage the given video. The communication make take various forms. As one possibility, the communication make include instructions configured to, when executed by client station 112, cause client station 112 to present the front-end interface for the management tool that enables the user to manage the given video. The communication may take other forms as well.

At block 516, after receiving the communication from back-end computing platform 102, client station 112 may present a front-end interface for the management tool. This front-end interface can take any of various forms. As one possibility, the front-end interface may enable the user to review viewer metrics for the given video, update sharing settings for the given video, and add viewer feedback elements and/or captions to the given video. The front-end interface can take other forms as well.

However, the function of accessing and presenting the front-end interface for the management tool could take other forms as well, including but not limited to the possibility that client station 112 may be capable of accessing and presenting the front-end interface for the management tool without interacting with back-end computing platform 102 (e.g., if a copy of the given video was previously accessed and is being stored at client station 112).

Figure 6B:
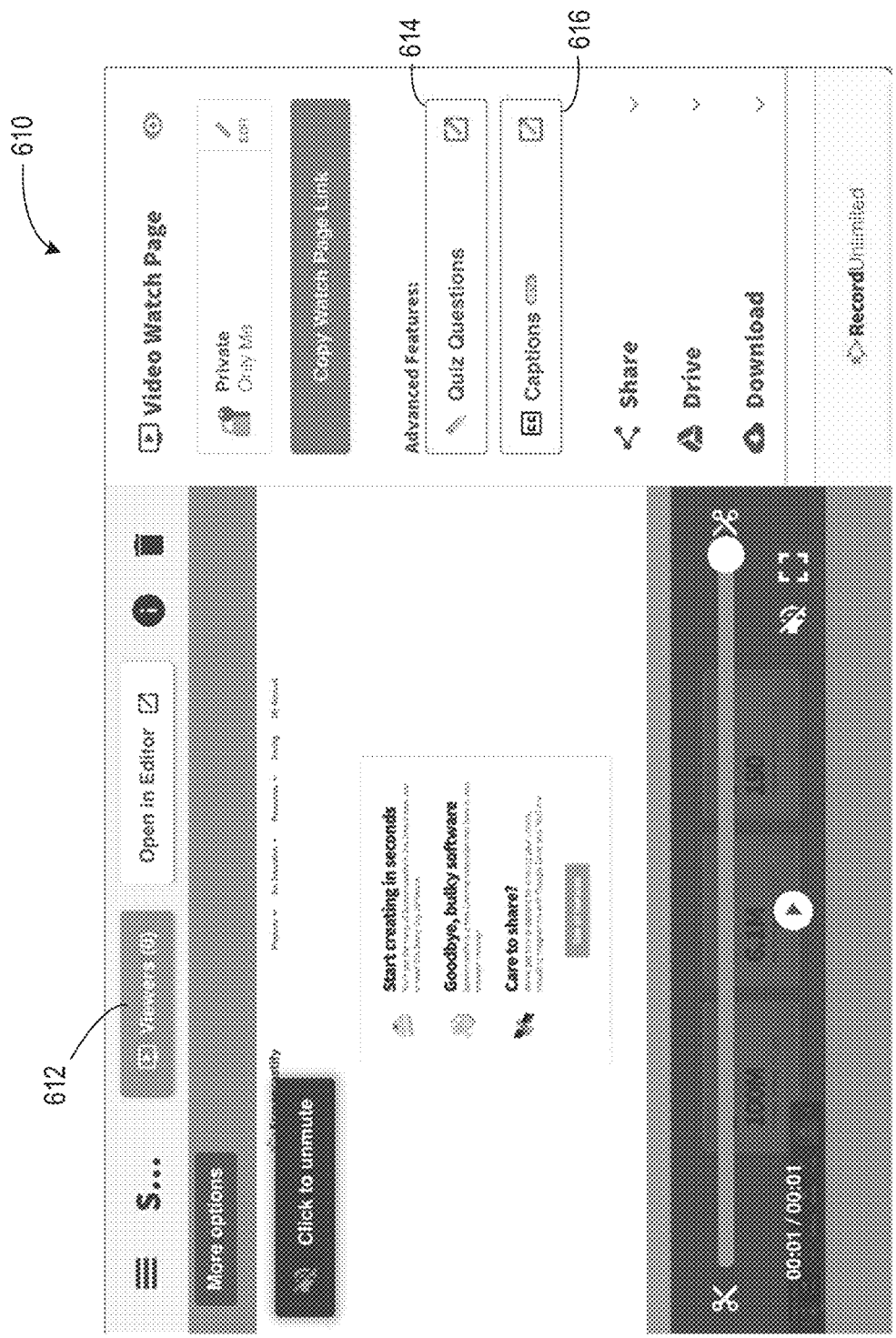
FIG. 6B depicts an example view of a front-end interface that may be presented to a user after a user selects a given video to manage using the disclosed software technology.

As one example to illustrate, FIG. 6B depicts an example view 610 of the front-end interface of the management tool that may be presented to a creating user who desires to manage the given video. As shown, example view 610 includes a selectable viewer metrics element 612, viewer feedback element 614, and caption element 616.

In general, selectable viewer metrics element 612 may enable a user to view certain viewer metrics related to the given video. In this respect, selectable viewer metrics element 606 may display one or more viewer metrics on selectable viewer metrics element 612 and when the user selects selectable viewer metrics element 612, this causes client station 112 to display another view of the front-end interface of the management tool that displays detailed viewer metrics related to the given video. The one or more viewer metrics displayed on selectable viewer metrics element 612 may take various forms, one example of which includes the number of viewers that have viewed the given video. As shown in FIG. 6B, selectable viewer metrics element 612 displays a "0" that indicates that no viewers have viewed the given video. The one or more viewer metrics displayed on selectable viewer metrics element 612 may take other forms as well.

Further, the detailed metrics displayed by client station 112 when a user selects selectable viewer metrics element 612 may take various forms as well. One type of viewer metric may take the form of the total number of viewers that have viewed the given video. This may be a beneficial metric for the creating user as it is indicative of the given video's level of engagement.

Another type of viewer metric may take the form of a total number of views. In this respect, this type of viewer metric represents the total number of times any user has viewed the given video.

Yet another type of viewer metric may take the form of an identification of viewers. The identification of viewers may take various forms as well. In one implementation, the identification of viewers may include each viewer's full name. In another implementation, the identification of viewers may include each viewer's nickname (e.g., a moniker chosen by the viewer when the viewer created an account with the SaaS application). In yet another implementation, the identification of viewers may include each viewer's email address. It should be understood that the identification of viewers may include some combination of the above as well (e.g., some full names, some nicknames, and some email addresses). The identification of viewers may take other forms as well.

Still yet another type of viewer metric may take the form of the most recent viewers of the given video. In this respect, the creating user may be able to see the viewers that watched the given video more recently and the viewers that watched the given video farther in the past. This may be beneficial in a context where viewing the video is time sensitive, such as a classroom setting where the students were instructed to view the video by a certain time or date.

Moreover, another type of viewer metric may take the form of the progress each viewer has made when viewing the given video. The progress may take various forms, one example of which may include the percentage of the given video watched on a viewer-by-viewer basis. In this respect, the creating user may be able to see the viewers that watched the given video to completion and the viewers that only watched part of the given video.

Further, another type of viewer metric may take the form of viewer feedback. The viewer feedback may take various forms as well. In one implementation, the viewer feedback may take the form of quiz or poll answers provided via viewer feedback elements that were displayed during presentation of the given video, which will be discussed in further detail below. In this respect, the viewer metrics may include a score (e.g., the fraction or percentage of correct responses submitted by the viewer). In another implementation, the viewer feedback may take the form of notes or annotations added to the given video by a viewer during viewing. The viewer feedback may take other forms as well. The viewer metrics may take other forms as well. The detailed metrics displayed by client station 112 when a user selects selectable viewer metrics element 612 may take various forms as well. Further, in practice, selectable viewer metrics element 612 may take any of various visual forms, including but not limited to the example form shown in FIG. 6B.

In general, viewer feedback element 614 may enable a user to add one or more viewer feedback elements to the given video. In this respect, when the user selects viewer feedback element 614, this causes client station 112 to present another view of the front-end interface of the management tool through which a user can add one or more viewer feedback elements to the given video. This view of the front-end interface of the management tool is discussed in further detail below with respect to FIG. 6C. In practice, viewer feedback element 614 may take any of various visual forms, including but not limited to the example form shown in FIG. 6B.

In general, caption element 616 may enable a user to add captions to the given video, which may aid in the viewing of the given video. In this respect, when the user selects caption element 616, this causes client station 112 to present a caption configuration pane (not shown) through which the user can select (i) whether to generate captions for display with the given video, (ii) the position of the captions (e.g., top and/or bottom of the screen), (iii) the size of the captions, and (iv) the font of the captions. Further, when the user selects to generate captions, this causes client station 112 to display the configured captions when presenting the given video to the user. In practice, caption element 616 may take any of various visual forms, including but not limited to the example form shown in FIG. 6B.

Turning back to FIG. 5, while the front-end user interface of the management tool is presented, at block 518, the user may interact with the front-end interface in various ways. As one possibility, the user may submit a request to see more detailed viewer metrics for the given video. The user may submit the request in various ways, one example of which is selecting selectable viewer metric element 612 as described above with respect to FIG. 6B. In this respect, when the user submits the request to see more detailed viewer metrics for the given video, this causes client station 112 to present another view of the front-end interface of the management tool that displays the detailed viewer metrics for the given video.

As another possibility, the user may input a request to update sharing settings for the given video. In this respect, when the user submits the request to update sharing settings for the given video, this causes client station 112 to present one or more adjustable sharing settings to the user. The one or more sharing settings may take various forms, including the sharing settings described above with respect to sharing pane 438 in FIG. 4C.

As yet another possibility, the user may input a request to access certain advanced features to manage the given video. These advanced features may take various forms, examples of which include features such as adding viewer feedback elements to the given video and adding captions to the given video.

The user may interact with the front-end interface of the management tool in other ways as well.

At block 520, depending on the nature of the user's interaction with the front-end interface of the management tool, client station 112 may send a communication to back-end computing platform 102. As one example, if the user submitted a request to see more detailed viewer metrics related to the given video, client station 112 may send a communication to back-end computing platform 102 that indicates the user's desire to see more detailed viewer metrics related to the given video. As another example, if the user submitted a request to add one or more advanced features to the given video, client station 112 may send a communication to back-end computing platform 102 reflecting that request.

After receiving the communication from client station 112, back-end computing platform 102 may, at block 522, send a communication to client station 112 that causes client station 112 to present another view of the front-end interface in accordance with the user's interaction with the previous view of the front-end interface. As one example, if the user submitted a request to see more detailed viewer metrics related to the given video, back-end computing platform 102 may send a communication to client station 112 that causes client station 112 to present another view of the front-end interface that displays detailed viewer metrics, such as the ones described above with respect to FIG. 6B. As another example, if the user submitted a request to add one or more advanced features to the given video, back-end computing platform 102 may send a communication to client station 112 that causes client station 112 to present another view of the front-end interface that enables the user to add one or more advanced features to the given video, such as the advanced features described above with respect to FIG. 6B.

After receiving the communication from back-end computing platform 102, client station 112 may, at block 524, present another view of the front-end interface in accordance with the user's interaction with the previous view of the front-end interface.

Figure 6C:
FIG. 6C depicts a modified example view of a front-end interface that be presented to a user after a user indicates that the user desires to add one or more viewer feedback elements to the given video.

As one example to illustrate, FIG. 6C depicts an example view 620 of the front-end interface of the management tool that may be presented to a user that submitted a request to add one or more user feedback elements to the given video. As shown, example view 620 includes navigation pane 622, selectable viewer feedback addition element 624, and viewer feedback configuration pane 626.

In general, navigation pane 622 may enable a user to navigate between different tabs of the front-end interface related to example view 620. The different tabs may take various forms. As one example, one tab may enable the creating user to add viewer feedback elements to the given video. In this respect, when the user selects one of the tabs shown in navigation pane 622, this causes the client station 112 to display the selected tab of the front-end interface. As shown, the "Quiz Questions" tab is selected within navigation pane 622. While inside this view, the creating user may be able to review the given video and add a viewer feedback element at a specified timestamp using selectable viewer feedback addition element 624. As another example, another tab may enable the user to share the given video once all desired viewer feedback elements are added to the given video. As yet another example, another tab may enable the user to view the viewer feedback provided through the one or more viewer feedback elements the user added to the given video. The different tabs shown in navigation pane 511 may take other forms as well. In practice, navigation pane 622 may take any of various visual forms, including but not limited to the example form shown in FIG. 6C.

In general, selectable viewer feedback addition element 624 may enable a user to add a viewer feedback element to the given video. In this respect, when the user selects the selectable viewer feedback addition element 624, this causes client station 112 to display another view of the front-end interface through which the user can add a viewer feedback element to the given video. For instance, as shown in FIG. 6C, the user has selected selectable viewer feedback addition element 624 at the 16 second mark of the video. As a result, client station 112 has displayed viewer feedback configuration pane 626 through which the user can create a quiz question for viewers to answer while watching the given video. In practice, selectable viewer feedback addition element 624 may take any of various visual forms, including but not limited to the example form shown in FIG. 6C.

In general, viewer feedback configuration pane 626 may enable a user to add a viewer feedback element to the given video. In this respect, when the user interacts with the viewer feedback configuration pane 626, this causes client station 112 to update viewer feedback configuration pane 626 in accordance with the user's input. As discussed above, the viewer feedback element may take various forms, examples of which may include quiz questions and poll questions, among others. For instance, as shown in FIG. 6C, the user is in the process of adding a viewer feedback element in the form of a quiz question that will be added to the video at the 16 second mark. In this example, the creating user can specify a title for the question, a time in the video at which the question should be displayed, and two or more answers from which a watching user can choose when subsequently viewing the video. In practice, viewer feedback configuration pane 626 may take any of various visual forms, including but not limited to the example form shown in FIG. 6C.

Turning back to FIG. 5, after receiving the user input adding a viewer feedback element to the given video, client station 112 may, at block 526, send a communication to back-end computing platform 102 indicating that a user has added a viewer feedback element to the given video, which is subsequently received by back-end computing platform 102.

After receiving the communication from client station 112, back-end computing platform may, at block 524, create and store a data record for the viewer feedback element. The data record may take various forms. As one example, the data record may include (i) an identifier of the video for which the viewer feedback element has been created (which may enable the data record for the viewer feedback element to be linked back to the data record for the video itself), (ii) an identifier for the viewer feedback element, (iii) an identifier for each of the predefined answers available for the viewer feedback element, (iv) an identifier for the creating user that added the viewer feedback element, (v) a title of the viewer feedback element, and/or (vi) the timestamp at which to insert the viewer feedback element into the given video, among other possibilities. Each of the entries in the data record may facilitate the display and/or access to the viewer feedback element. The data record may take other forms as well.

It should be understood that a user accessing the front-end interface of the management tool may utilize the management tool to perform any of the above management functions for a given video at any of various times. Further, the user may utilize the management tool to perform these functions for any of the other videos recorded by the user and displayed in the list of previously-recorded videos. Further yet, it should be understood that the functions described above in relation to the management tool are merely provided as examples, and it is possible that the management tool could facilitate various other management tasks for a given video as well.

c. Third Software Tool

According to a third aspect, the disclosed software technology may comprise a third software tool that enables a watching user to access and watch videos that have been recorded via the record tool and stored at a third-party cloud storage platform, and may also enable the watching user to interact with viewer feedback elements that are presented to the watching user while watching such videos (e.g., by inputting responses to quiz questions, polls, or the like). This third software tool may be referred to herein as the "watch tool."

Figure 7:
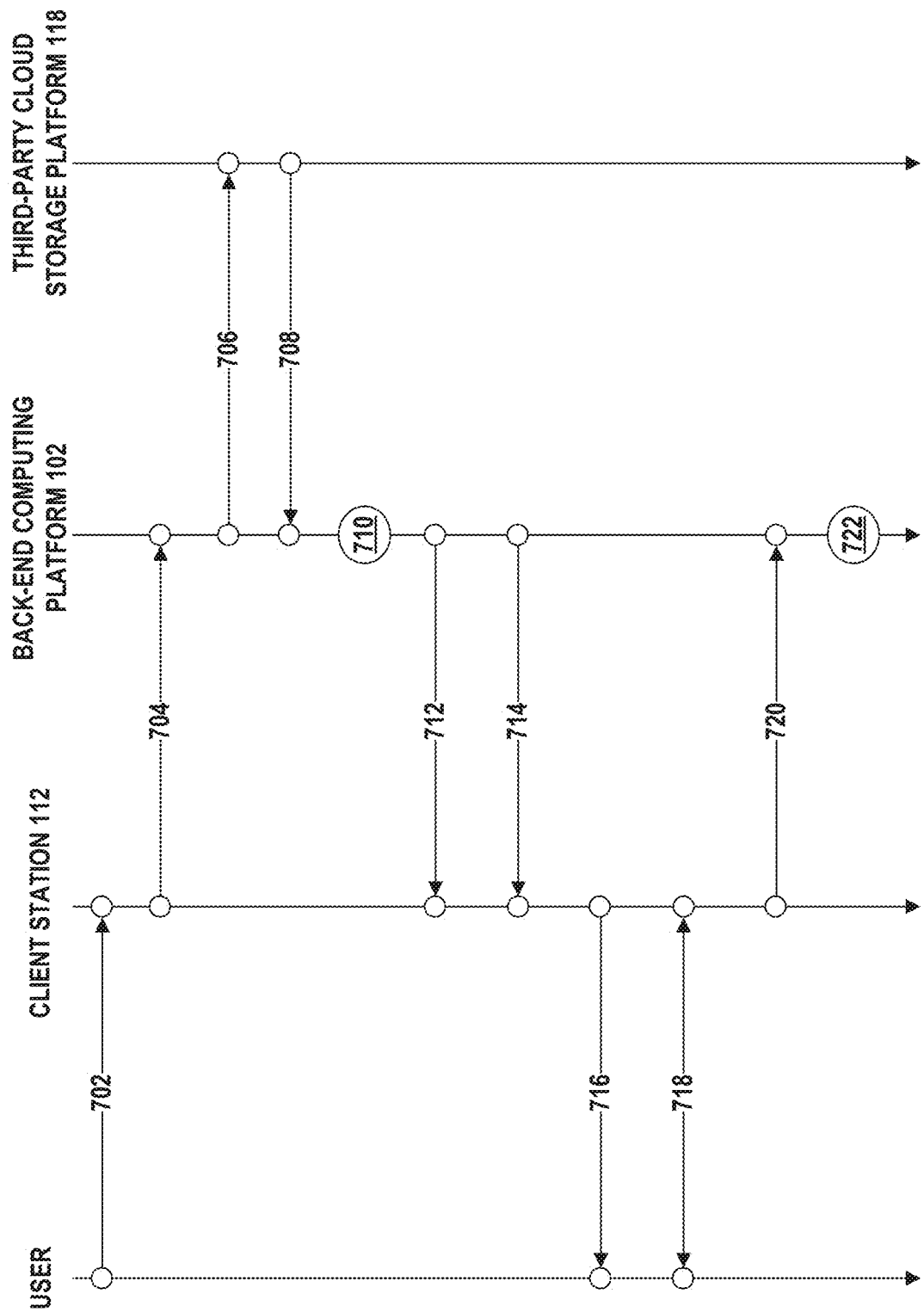
FIG. 7 depicts an example message flow diagram for accessing and watching videos that have been recording using the disclosed software technology.

FIG. 7 illustrates some example functions that may be carried out in accordance with the watch tool. For the purposes of illustration only, the example functions are described as being carried out within the example network configuration 100 of FIG. 1, which includes client station 112, back-end computing platform 102, and third-party cloud storage platform 118. Further, it should be understood that the flow diagram illustrated in FIG. 7 is merely described in such a manner for the sake of clarity and explanation and that some functions may be carried out in various other manners as well, including the possibility that example functions may be added, removed, rearranged into different orders, grouped together, and/or not grouped together at all.

According to one example embodiment in which the disclosed software technology has been incorporated into a SaaS application, a watching user may, at block 702, input a request to access and watch a recorded video, which is received by client station 112. The watching user may input the request in various ways. As one possibility, the watching user may submit the request by clicking and/or activating a URL associated with the given video that was generated via the record or management tool described above. In this respect, the watching user may have been provided the URL from a creating user. As another possibility, the watching user may submit the request by locating and selecting the video from a list of publicly available videos stored on back-end computing platform 102. In this respect, the SaaS application may provide the watching user with a selectable element through which the user can select a given video from the list of publicly available videos. The watching user may submit the request in other ways as well.

After receiving the watching user's request, client station 112 may access and present the given video. This function of accessing and presenting the given video may take various forms, and at least in some implementations, may involve interaction with back-end computing platform 102.

For example, in response to receiving the user's request, client station 112 may, at block 704, send a communication to back-end computing platform 102 indicating the user's request to access and watch a given video, which is received by back-end computing platform 102. The communication may take various forms. As one possibility, the communication may include information related to the watching user that can be used by back-end computing platform 102 to authenticate the user's account to ensure the watching user has been granted access to the recorded video. In this respect, the user may have previously created an account with the SaaS platform that enables the user to access the watch tool. The communication may take other forms as well. After receiving the communication from client station 112, back-end computing platform 102 may send a communication back to client station 112.

However, the function of accessing and presenting the given video could take other forms as well, including but not limited to the possibility that client station 112 may be capable of accessing and presenting the given video without interaction with back-end computing platform 102 (e.g., if a copy of the given video was previously accessed and is being stored at client station 112).

In implementations where client station 112 interacts with back-end computing platform 102, after receiving the communication from client station 112, back-end computing platform 102 may access a data record for the given video to determine whether to provide the watching user with access to the video. In this respect, the data record for the given video may contain a field related to the permissions of the given video, which may have been set by a creating user using the record and/or management tool described above. Further, back-end computing platform 102 may access the data record for the given video and if the watching user has appropriate permissions, provide access to the given video.

At block 706, if back-end computing platform 102 determines to provide the watching user with access to the given video, back-end computing platform may send a request to third-party cloud storage platform 118 to access the given video, which is received by third-party cloud storage platform 118. The request may take various forms. As one possibility, the request may take the form of one or more Hypertext Transfer Protocol (HTTP) requests that include (i) an identifier of the recorded video, (ii) an identifier indicating the user that recorded the video, and (iii) an authentication token that be used by third-party cloud storage platform 118 to determine whether back-end computing platform 102 should be allowed access to the given video. The request may take other forms as well.

After receiving the request from back-end computing platform 102, at block 708, third-party cloud storage platform 118 may locate the given video and send the given video to back-end computing platform 102, which is received by back-end computing platform 102. In this respect, third-party cloud storage platform 118 may parse the received request from back-end computing platform 102 and send the given video to back-end computing platform 102. The video may be sent in various ways. As one example, the video may be sent as part of one or more HTTP responses, which are received by back-end computing platform 102. The video may be sent in other ways as well.

At block 710, back-end computing platform 102 may prepare the given video for streaming to client station 112. Preparing the given video to stream to client station 112 may take various forms as well. As one example, preparing the video to stream to client station 112 may involve segmenting the video into segments that are separately sent to client station 112 for display. The segments may take various forms as well. In one implementation, each segment may be configured to be a particular length (e.g., two seconds, etc.) and may include respective metadata, such as the file type of the segment, timestamp information (e.g., the beginning and end of the segment), and in some cases, data related to the entire given video. Preparing the given video to stream to client station 112 may take other forms as well.

Further, it should be understood that the function of back-end computing platform 102 preparing the given video for streaming may be performed in parallel with the function of third-party cloud storage platform 118 sending the given video to back-end computing platform 102. In this respect, back-end computing platform 102 may prioritize the generating and streaming of certain segments based on one or more factors. For instance, the default operation of back-end computing platform 102 may be to generate and stream segments to client station 112 in order starting from the beginning of the given video. In turn, client station 112 may be configured to begin playing back the given video as soon as it receives the first segment (or at least as soon as it receives the first few segments) from back-end computing platform 102. In this respect, client station 112 may be able to begin playing back the given video shortly after back-end computing platform 102 begins preparing and streaming the given video. As such, as client station 112 plays back the given video, back-end computing platform 102 may continue to generate and stream later segments in order.

Further yet, as client station 112 is playing back the received earlier segments and back-end computing platform 102 is continuing to generate and stream later segments, a user may navigate to another potion of the given video that differs from the portion of the video that client station 112 is playing back. In this respect, if the user navigates to some portion of the video that differs from the portion that client station 112 is playing back, this causes back-end computing platform 102 to stop generating and streaming the segments in a continual sequence from the start of the given video, skip to the portion of the given video that corresponds to the point where the user navigated, and begin to generate and stream segments for that portion of the given video.

In this way, the disclosed functionality advantageously allows a user to begin viewing the given video and also interact with the given video shortly after back-end computing platform 102 begins preparing and streaming the given video to client station 112, which may be well before back-end computing platform 102 has completed preparing and streaming the given video.

At block 712, back-end computing platform 102 may send manifest data for the given video to client station 112, which is subsequently received by client station 112. The manifest data may take various forms. As one possibility, the manifest data may include (i) a full list of segments with timestamp information for each segment, (ii) instructions that specify how client station 112 should combine the segments together for presentation to the watching user, (iii) video metadata related to the given video, and/or (iv) viewer feedback element data. In this respect, the manifest data enables client station 112 to seamlessly present the given video to the watching user. The viewer feedback element data may take various forms as well, examples of which include (i) a timestamp at which to display the viewer feedback element within the given, (ii) an identifier for the viewer feedback element, (iii) a description of viewer feedback element (e.g., the title of the quiz question or poll), (iv) an identifier for each of the possible answers to the viewer feedback element, and (v) an identifier for the creating user that added the viewer feedback element. The manifest data may take other forms as well.

At block 714, back-end computing platform 102 begins to stream the given video to client station 112 by sending the video segments, which are received by client station 112. Back-end computing platform 102 may stream the given video to client station 112 in various ways. As one possibility, back-end computing platform 102 may send each segment to client station 112 as it is created. In this respect, back-end computing platform 102 may send each individual segment to client station 112. As another possibility, back-end computing platform 102 may wait until a certain number of segments are created before sending the segments to client station 112. Back-end computing platform 102 may stream the given video to client station 112 in other ways as well.

Further, as back-end computing platform 102 begins to stream the given video to client station 112, back-end computing platform 102 may update viewer metrics related to the given video to indicate that a new user has accessed the given video for viewing. Back-end computing platform 102 may update the viewer metrics by accessing the data record associated with the given video and updating the relevant viewer metrics (e.g., total number of views, progress, etc.) related to the watching user's viewing of the given video.

At block 716, client station 112 may use the manifest data and the video segments to begin playing the video. In this respect, client station 112 may present a front-end interface of the watch tool that includes video player software configured to play the given video using the manifest data and video segments. In order to accomplish this, client station 112 puts the video segments in the proper sequence and renders the segments in the correct order via the video player software. Further, if the manifest data includes viewer feedback element data, then the video player software is configured to (i) add an indicator on the video player software that indicates the time(s) at which a viewer feedback element is to be presented to the watching user and (ii) pause playback of the given video at the indicated time and present the viewer feedback element to the watching user for interaction. In this respect, each indicator on the video player software that indicates the time(s) at which a viewer feedback element is to be presented may be color-coded to indicate to the watching user whether a response has been provided to a given viewer feedback element.

Figure 8A:
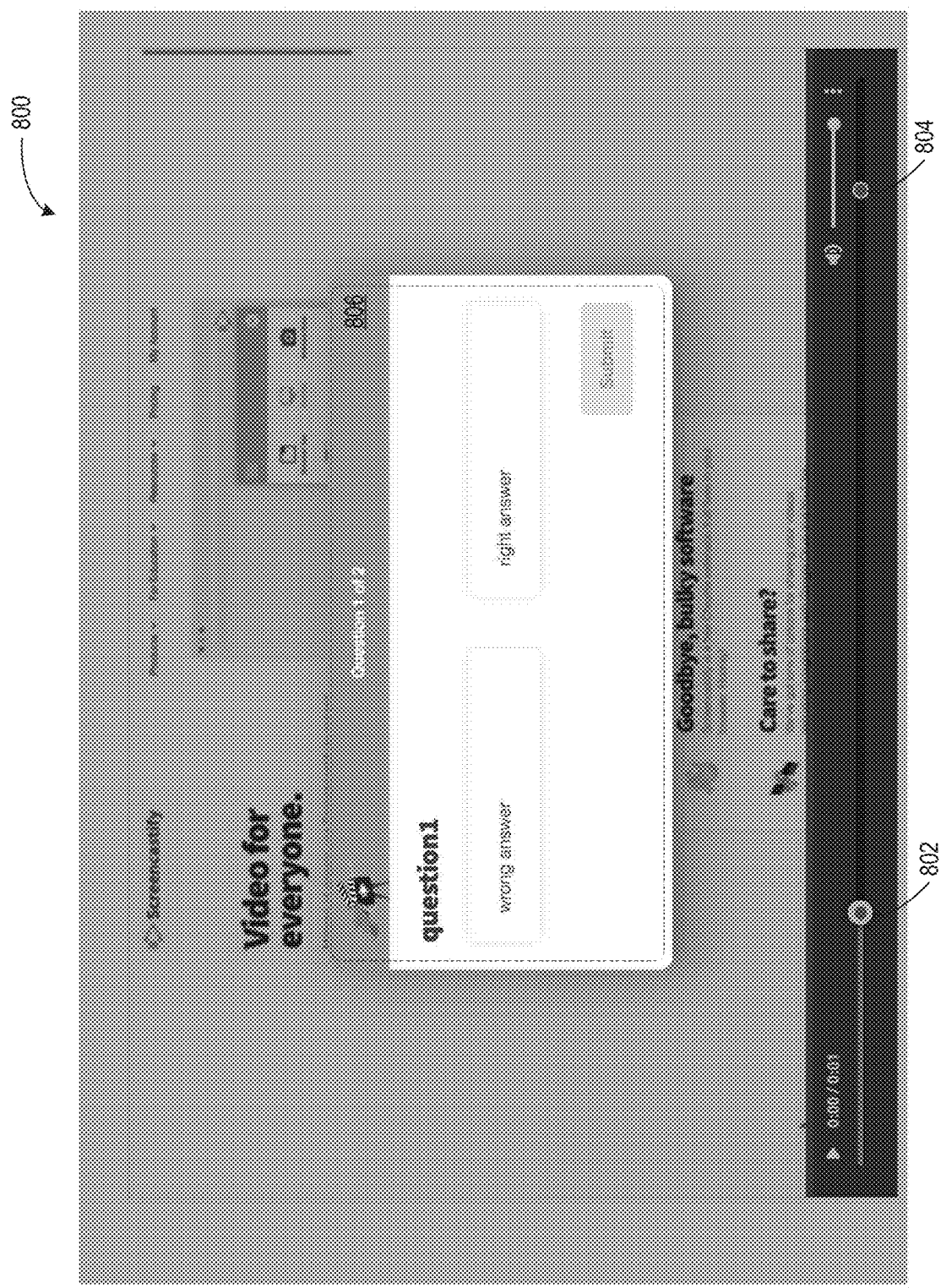
FIG. 8A depicts an example view of a front-end interface that may be presented to a user to view a given video using the disclosed software technology.

As one example to illustrate, FIG. 8A depicts an example view 800 of a front-end interface that may be presented to a viewing user who desires to view the given video. The front-end interface may be presented in various ways, examples of which include presenting the front-end interface as part of an extension within a web browser, as part of a standalone webpage, or as part of a page within a mobile application, among other possibilities. As shown, example view 800 includes play head indicators 802 and 804, and viewer feedback element 806.

In general, play head indicators 802 and 804 may enable a user to (i) see the time in the given video at which a viewer feedback element (e.g., viewer feedback element 806) will be presented to the user, and (ii) once the user has provided a response to the viewer feedback element, provide a visual indication of whether the provided response was correct or incorrect. In this respect, when the user provides a response to the viewer feedback element, this causes client station 112 to update the front-end interface to indicate whether the response was correct or incorrect by changing the color of the play head indicator that corresponds to the viewer feedback element to which the user provided a response. In practice, play head indicators 802 and 804 may take any of various visual forms, including but not limited to the example form shown in FIG. 8A.

In general, viewer feedback element 806 may enable a user to provide viewer feedback, such as answering a quiz or poll question. In this respect, viewer feedback element 806 may provide the user with a question and one or more answers from which the user can choose. As shown in FIG. 8A, viewer feedback element 806 has provided a quiz question with a "wrong answer" and a "right answer" from which the user can choose. In turn, the user may provide a response to viewer feedback element 806 by selecting one of the two provided answers, which in turn may cause client station 112 to (i) update the front-end interface to indicate whether the user's response was correct or incorrect and (ii) send the user's response to back-end computing platform 102. In practice, viewer feedback element 806 may take any of various visual forms, including but not limited to the example form shown in FIG. 8A.

Turning back to FIG. 7, at block 718, while client station 112 is playing the given video, the watching user may interact with the playing video. The watching user may interact with the playing video in various ways. As one possibility, the watching user may input playback commands such as play, pause, seeks, and/or stop. As another possibility, the user may provide responses to the viewer feedback elements, to the extent they exist. For instance, the viewer feedback element may be a quiz question that states "What is the square root of 16?" with potential answers "2," "4," "6," and "8." The watching user may submit the viewer feedback through providing a response of "4." The user may submit the viewer feedback in other ways as well.

Further, once a user provides a response to a viewer feedback element, client station 112 may update the front-end interface to change the color and/or appearance of the indicator on the video player software that indicates the time(s) at which a viewer feedback element is to be presented. For instance, if the indicator for a given viewer feedback element is initially white to indicate that a response has not yet been provided then, in response to receiving a response for the given viewer feedback element, client station 112 may update the front-end interface to display the indictor as green if the response was correct and red if the response was incorrect. In turn, this may indicate to the user that a response has already been provided for the given viewer feedback element.

The watching user may interact with the playing video in other ways as well.

Figure 8B:
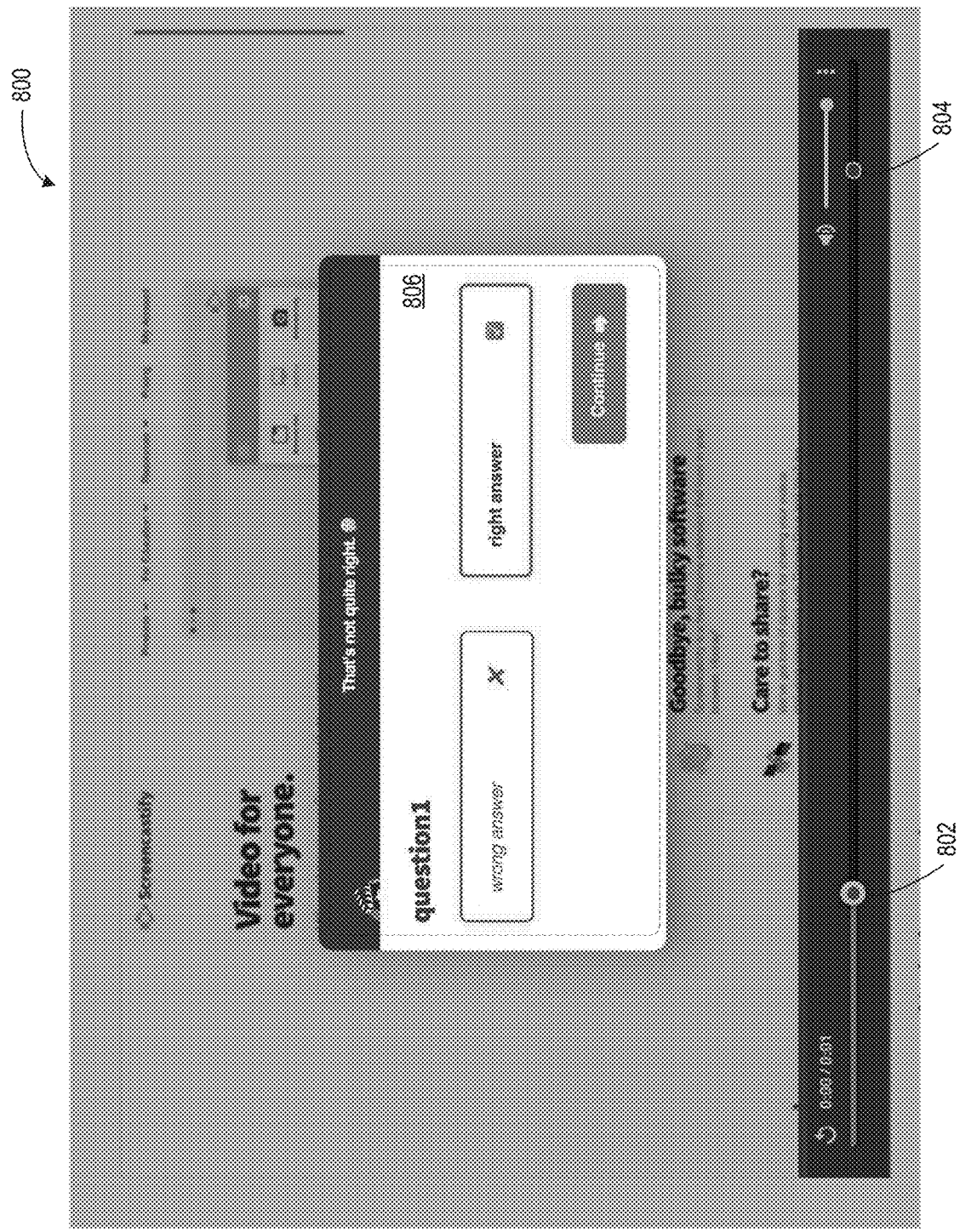
FIG. 8B depicts a modified example view of a front-end interface that may be presented to a user in response to receiving an incorrect response to a viewer feedback element using the disclosed software technology.

As one example to illustrate, FIG. 8B depicts a modified example view 800 of the front-end interface that may be presented to a viewing user after the user has provided an incorrect response to viewer feedback element 806 described above with respect to FIG. 8A. As shown, modified example view 800 includes modified versions of play head indicators 802 and 804 and viewer feedback element 806. For instance, since the user has provided an incorrect response to viewer feedback element 806, the color (not shown) of play head indicator 802 has been modified to be red. Further, viewer feedback element 806 has been modified to show that the user has provided an incorrect response, which is indicated by an "X" mark next to the selected answer and a check mark next to the unselected, correct answer.

Turning back to FIG. 7, at block 720, while the video is playing, client station 112 may send information related to the video playback to back-end computing platform 102. As one example, client station 112 may send information related to the user's viewing progress for the video (e.g., the extent to which the watching user has viewed the given video. Client station 112 may send this information at various times. As one possibility, client station 112 may periodically send this information. As another possibility, client station 112 may send this information in response to a triggering event (e.g., when the watching user issues a playback command such as play, pause, seek, and/or stop). As another example, if the given video includes viewer feedback elements, client station 112 may send information including the watching user's responses to the viewer feedback elements. There may be other examples in which client station 112 may send information related to the video playback to back-end computing platform 102.

At block 722, after receiving information about the video playback from client station 112, back-end computing platform 102 may update the viewer metrics for the given video. In this respect, back-end computing platform 102 may update the viewer metrics in various ways. As one possibility, back-end computing platform 102 may access the data record for the given video stored at back-end computing platform 102 and subsequently update one or more viewer metrics within the data record. Back-end computing platform 102 may update one or more viewer metrics within the data record for the given video in various ways as well. As one example, back-end computing platform 102 may, based on the information received from client station 112, add the identifier for the watching user to the list of users that have begun viewing the given video. As another example, back-end computing platform 102 may, based on the information received from client station 112, update the watching user's viewing progress for the given video, which may take the form of an indication of how much of the given video has been viewed (e.g., the time and/or percentage completed) and/or an indication of whether the watching user has finished viewing the given video. Back-end computing platform 102 may update one or more viewer metrics within the data record for the given video in other ways as well.

As another possibility, based on the information received from client station 112, back-end computing platform 102 may update the viewer feedback element data for the given video to include the watching user's responses to the viewer feedback elements.

Back-end computing platform 102 may update the viewer metrics in other ways as well.

Further, once back-end computing platform 102 updates the viewer metrics in the manner described above, back-end computing platform 102 may make the updated viewer metrics available to the creating user to access and review via the management tool described above.

It should be understood that the functions described above in relation to the watch tool are merely provided as examples, and it is possible that the watch tool could facilitate various other tasks related to accessing and watching a video as well.

CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," "parties," or other entities, this is for purposes of example and explanation only. Claims should not be construed as requiring action by such actors unless explicitly recited in claim language.

We claim:

1. A computing platform that is hosting a software as a service (SaaS) application, the computing platform comprising:
a communication interface;
at least one processor;
a non-transitory computer-readable medium; and
program instructions stored on the non-transitory computer-readable medium that are executable by the at least one processor such that the computing platform is configured to:
cause a first client station that is remote from the computing platform and is associated with a first user to present a first interface of the SaaS application that enables recording of videos;
receive, from the first client station, a given video that was recorded at the first client station utilizing the first interface;
after receiving the given video, transmit a request for the given video to be stored at a third-party cloud storage platform that is remote from the computing platform;
thereafter receive from a second client station that is remote from the computing platform and is associated with a second user, a communication indicating a request by the second user to watch the given video;
after receiving the communication indicating the request by the second user to watch the given video:
cause the second client station to present a second interface of the SaaS application that enables watching of videos;
transmit a request to obtain the given video from the third-party cloud storage platform;
as a result of transmitting the request to obtain the given video from the third-party cloud storage platform, receive the given video from the third-party cloud storage platform;
divide the given video into a sequence of video segments; and stream the sequence of video segments to the second client station for playback via the second interface of the SaaS application.

2. The computing platform of claim 1, further comprising program instructions stored on the non-transitory computer-readable medium that are executable by the at least one processor such that the computing platform is configured to:
maintain a set of one or more viewer metrics for the given video.

3. The computing platform of claim 2, wherein the set of one or more viewer metrics comprises one or more of (i) a total number of views, (ii) an identification of viewers, (iii) a user's viewing progress, or (iv) responses to viewer feedback elements.

4. The computing platform of claim 2, further comprising program instructions stored on the non-transitory computer-readable medium that are executable by the at least one processor such that the computing platform is configured to:
update the set of one or more viewer metrics to indicate that the second user has begun watching the given video.

5. The computing platform of claim 2, further comprising program instructions stored on the non-transitory computer-readable medium that are executable by the at least one processor such that the computing platform is configured to:
update the set of one or more viewer metrics to indicate the second user's viewing progress for the given video.

6. The computing platform of claim 2, further comprising program instructions stored on the non-transitory computer-readable medium that are executable by the at least one processor such that the computing platform is configured to:
receive, from the first client station, a communication indicating a request by the first user to review the set of one or more viewer metrics for the given video; and
after receiving the communication indicating the request by the first user to review the viewer metrics for the given video, cause the first client station to present the set of one or more viewer metrics for the given video.

7. The computing platform of claim 1, further comprising program instructions stored on the non-transitory computer-readable medium that are executable by the at least one processor such that the computing platform is configured to:
receive, from the first client station, a communication indicating a request by the first user to add one or more viewer feedback elements to the given video; and
after receiving the communication indicating a request by the first user to add the one or more viewer feedback elements to the given video, create and store data representing the one or more viewer feedback elements for the given video.

8. The computing platform of claim 7, wherein the one or more viewer feedback elements each comprise a set of respective pre-defined answers from which a user can choose.

9. The computing platform of claim 1, further comprising program instructions stored on the non-transitory computer-readable medium that are executable by the at least one processor such that the computing platform is configured to:
after receiving the given video, creating a data record containing metadata for the given video.

10. The computing platform of claim 9, wherein the metadata for the given video contained within the data record comprises one or more of (i) a length of the given video, (ii) a size of the given video, (iii) dimensions of the given video, or (iv) time information of the given video.

11. A non-transitory computer-readable medium having program instructions stored thereon that are executable by at least one processor such that a computing platform that is hosting a software as a service (SaaS) application is configured to:
cause a first client station that is remote from the computing platform and is associated with a first user to present a first interface of the SaaS application that enables recording of videos;
receive, from the first client station, a given video that was recorded at the first client station utilizing the first interface;
after receiving the given video, transmit a request for the given video to be stored at a third-party cloud storage platform that is remote from the computing platform;
thereafter receive from a second client station that is remote from the computing platform and is associated with a second user, a communication indicating a request by the second user to watch the given video;
after receiving the communication indicating the request by the second user to watch the given video:
cause the second client station to present a second interface of the SaaS application that enables watching of videos;
transmit a request to obtain the given video from the third-party cloud storage platform;
as a result of transmitting the request to obtain the given video from the third-party cloud storage platform, receive the given video from the third-party cloud storage platform;
divide the given video into a sequence of video segments; and
stream the sequence of video segments to the second client station for playback via the second interface of the SaaS application.

12. The non-transitory computer-readable medium of claim 11, further comprising program instructions stored thereon that are executable by the at least one processor such that the computing platform is configured to:
maintain a set of one or more viewer metrics for the given video.

13. The non-transitory computer-readable medium of claim 12, wherein the set of one or more viewer metrics comprises one or more of (i) a total number of views, (ii) an identification of viewers, (iii) a user's viewing progress, or (iv) responses to viewer feedback elements.

14. The non-transitory computer-readable medium of claim 12, further comprising program instructions stored thereon that are executable by the at least one processor such that the computing platform is configured to:
update the set of one or more viewer metrics to indicate that the second user has begun watching the given video.

15. The non-transitory computer-readable medium of claim 12, further comprising program instructions stored thereon that are executable by the at least one processor such that the computing platform is configured to:
update the set of one or more viewer metrics to indicate the second user's viewing progress for the given video.

16. The non-transitory computer-readable medium of claim 12, further comprising program instructions stored thereon that are executable by the at least one processor such that the computing platform is configured to:
receive, from the first client station, a communication indicating a request by the first user to review the set of one or more viewer metrics for the given video; and
after receiving the communication indicating the request by the first user to review the viewer metrics for the given video, cause the first client station to present the set of one or more viewer metrics for the given video.

17. The non-transitory computer-readable medium of claim 11, further comprising program instructions stored thereon that are executable by the at least one processor such that the computing platform is configured to:
receive, from the first client station, a communication indicating a request by the first user to add one or more viewer feedback elements to the given video; and
after receiving the communication indicating a request by the first user to add the one or more viewer feedback elements to the given video, create and store data representing the one or more viewer feedback elements for the given video.

18. The non-transitory computer-readable medium of claim 17, wherein the one or more viewer feedback elements each comprise a set of respective pre-defined answers from which a user can choose.

19. A method comprising:
causing, by a computing platform, a first client station that is remote from the computing platform and is associated with a first user to present a first interface of a SaaS application that enables recording of videos;
receiving, by the computing platform from the first client station, a given video that was recorded at the first client station utilizing the first interface;
after receiving the given video, transmitting, by the computing platform, a request for the given video to be stored at a third-party cloud storage platform that is remote from the computing platform;
thereafter receiving, by the computing platform and from a second client station that is remote from the computing platform and is associated with a second user, a communication indicating a request by the second user to watch the given video;
after receiving the communication indicating the request by the second user to watch the given video:
causing, by the computing platform, the second client station to present a second interface of the SaaS application that enables watching of videos;
transmitting, by the computing platform, a request to obtain the given video from the third-party cloud storage platform;
as a result of transmitting the request to obtain the given video from the third-party cloud storage platform, receiving, by the computing platform, the given video from the third-party cloud storage platform;
dividing, by the computing platform, the given video into a sequence of video segments; and
streaming, by the computing platform, the sequence of video segments to the second client station for playback via the second interface of the SaaS application.

20. The method of claim 19, further comprising:
maintaining, by the computing platform, a set of one or more viewer metrics for the given video.

* * * * *